United States Patent
Medard et al.

(10) Patent No.: US 9,369,255 B2
(45) Date of Patent: Jun. 14, 2016

(54) METHOD AND APPARATUS FOR REDUCING FEEDBACK AND ENHANCING MESSAGE DISSEMINATION EFFICIENCY IN A MULTICAST NETWORK

(71) Applicant: MASSACHUSETTS INSTITUTE OF TECHNOLOGY, Cambridge, MA (US)

(72) Inventors: Muriel Medard, Belmont, MA (US); Linda M. Zeger, Lexington, MA (US); Arman Rezaee, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 767 days.

(21) Appl. No.: 13/655,034

(22) Filed: Oct. 18, 2012

(65) Prior Publication Data

US 2015/0358136 A1     Dec. 10, 2015

(51) Int. Cl.
| | |
|---|---|
| H04L 1/00 | (2006.01) |
| H04L 12/28 | (2006.01) |
| H04W 4/00 | (2009.01) |
| H04H 20/71 | (2008.01) |
| H04J 11/00 | (2006.01) |
| H04N 7/12 | (2006.01) |
| H04L 5/00 | (2006.01) |

(52) U.S. Cl.
CPC ............ *H04L 5/0055* (2013.01); *H04L 1/0056* (2013.01); *H04L 5/0019* (2013.01); *H04L 5/0082* (2013.01)

(58) Field of Classification Search
None
See application file for complete search history.

(56) References Cited

U.S. PATENT DOCUMENTS

| | | |
|---|---|---|
| 5,577,056 A | 11/1996 | Malik et al. |
| 6,128,773 A | 10/2000 | Snider |
| 6,621,851 B1 | 9/2003 | Agee et al. |
| 6,885,653 B2 | 4/2005 | Choi et al. |
| 7,064,489 B2 | 6/2006 | Price |
| 7,071,853 B2 | 7/2006 | Price |
| 7,095,343 B2 | 8/2006 | Xie et al. |
| 7,164,691 B2 | 1/2007 | Knapp et al. |
| 7,283,564 B2 | 10/2007 | Knapp et al. |
| 7,349,440 B1 | 3/2008 | Chou et al. |

(Continued)

FOREIGN PATENT DOCUMENTS

| | | |
|---|---|---|
| EP | 1 638 239 A1 | 3/2006 |
| WO | WO 2007/109216 A1 | 9/2007 |

(Continued)

OTHER PUBLICATIONS

U.S. Appl. No. 13/654,953, filed Oct. 18, 2012, Zeger, et al.

(Continued)

*Primary Examiner* — Kiet Tang
(74) *Attorney, Agent, or Firm* — Daly, Crowley, Mofford & Durkee, LLP

(57) ABSTRACT

Message dissemination speed is increased during multicast operations in a network by intelligently selecting one or more feedback time slots for use by destination nodes. In at least one implementation, a feedback time slot is selected based upon probabilities that a plurality of data packets will be successfully distributed to a plurality of destination nodes by various future time slots. These probabilities may be estimated based on, for example, packet erasure probabilities in the network. In some implementations, only destination nodes that have not yet successfully received a plurality of data packets are permitted to transmit feedback during feedback time slots.

56 Claims, 10 Drawing Sheets

(56) References Cited

U.S. PATENT DOCUMENTS

| | | | |
|---|---|---|---|
| 7,408,938 B1 | 8/2008 | Chou et al. | |
| 7,414,978 B2 | 8/2008 | Lun et al. | |
| 7,529,198 B2 | 5/2009 | Jain et al. | |
| 7,706,365 B2 | 4/2010 | Effros et al. | |
| 7,760,728 B2 | 7/2010 | Chou et al. | |
| 7,821,980 B2 | 10/2010 | Chakrabarti et al. | |
| 7,876,677 B2 | 1/2011 | Cheshire | |
| 7,912,003 B2 | 3/2011 | Radunovic et al. | |
| 7,945,842 B2 | 5/2011 | He | |
| 8,040,836 B2 | 10/2011 | Wu et al. | |
| 8,068,426 B2 | 11/2011 | Sundararajan et al. | |
| 8,130,776 B1 | 3/2012 | Sundararajan et al. | |
| 8,279,781 B2 | 10/2012 | Lucani et al. | |
| 8,451,756 B2 | 5/2013 | Lucani et al. | |
| 8,482,441 B2 | 7/2013 | Medard et al. | |
| 8,504,504 B2 | 8/2013 | Liu | |
| 8,571,214 B2 | 10/2013 | Lima et al. | |
| 2002/0064167 A1* | 5/2002 | Khan | H04L 1/1887 370/410 |
| 2003/0055614 A1 | 3/2003 | Pelikan | |
| 2003/0214951 A1 | 11/2003 | Joshi et al. | |
| 2004/0203752 A1 | 10/2004 | Wojaczynski et al. | |
| 2005/0010675 A1 | 1/2005 | Jaggi et al. | |
| 2005/0078653 A1 | 4/2005 | Agashe et al. | |
| 2005/0152391 A1 | 7/2005 | Effros et al. | |
| 2005/0251721 A1 | 11/2005 | Ramesh et al. | |
| 2006/0020560 A1 | 1/2006 | Rodriguez et al. | |
| 2006/0146791 A1 | 7/2006 | Deb et al. | |
| 2006/0224760 A1 | 10/2006 | Yu et al. | |
| 2007/0046686 A1 | 3/2007 | Keller | |
| 2007/0116027 A1 | 5/2007 | Ciavaglia et al. | |
| 2007/0274324 A1 | 11/2007 | Wu et al. | |
| 2008/0043676 A1 | 2/2008 | Mousseau et al. | |
| 2008/0049746 A1 | 2/2008 | Morrill et al. | |
| 2008/0069242 A1* | 3/2008 | Xu | H04N 19/395 375/240.24 |
| 2008/0123579 A1 | 5/2008 | Kozat et al. | |
| 2008/0165717 A1* | 7/2008 | Chen | H04W 72/005 370/312 |
| 2008/0259796 A1 | 10/2008 | Abousleman et al. | |
| 2008/0291834 A1 | 11/2008 | Chou et al. | |
| 2008/0320363 A1 | 12/2008 | He | |
| 2009/0003216 A1* | 1/2009 | Radunovic | H04L 45/123 370/237 |
| 2009/0135717 A1 | 5/2009 | Kamal et al. | |
| 2009/0153576 A1 | 6/2009 | Keller | |
| 2009/0175320 A1 | 7/2009 | Haustein et al. | |
| 2009/0198829 A1 | 8/2009 | Sengupta et al. | |
| 2009/0207930 A1 | 8/2009 | Sirkeci et al. | |
| 2009/0238097 A1 | 9/2009 | Le Bars et al. | |
| 2009/0248898 A1 | 10/2009 | Gkantsidis et al. | |
| 2009/0285148 A1 | 11/2009 | Luo et al. | |
| 2009/0310582 A1 | 12/2009 | Beser | |
| 2009/0313459 A1 | 12/2009 | Horvath | |
| 2009/0316763 A1 | 12/2009 | Erkip et al. | |
| 2010/0014669 A1 | 1/2010 | Jiang | |
| 2010/0046371 A1 | 2/2010 | Sundararajan et al. | |
| 2010/0111165 A1 | 5/2010 | Kim et al. | |
| 2010/0146357 A1 | 6/2010 | Larsson | |
| 2011/0238855 A1 | 9/2011 | Korsunsky et al. | |
| 2012/0026991 A1* | 2/2012 | Niu | H04B 7/0417 370/338 |
| 2012/0057636 A1 | 3/2012 | Tian et al. | |
| 2012/0155275 A1* | 6/2012 | Massoulie | H04L 45/64 370/236 |
| 2012/0218891 A1 | 8/2012 | Sundararajan et al. | |
| 2012/0300692 A1 | 11/2012 | Sfar et al. | |
| 2013/0107764 A1 | 5/2013 | Zeger et al. | |
| 2013/0114481 A1 | 5/2013 | Kim et al. | |
| 2013/0114611 A1 | 5/2013 | Zeger et al. | |
| 2013/0195106 A1 | 8/2013 | Calmon et al. | |
| 2014/0064296 A1 | 3/2014 | Haeupler et al. | |
| 2014/0140189 A1* | 5/2014 | Shattil | H04B 7/026 370/208 |
| 2014/0185803 A1 | 7/2014 | Lima et al. | |
| 2014/0268398 A1 | 9/2014 | Medard et al. | |
| 2014/0269485 A1 | 9/2014 | Medard et al. | |
| 2014/0269503 A1 | 9/2014 | Medard et al. | |
| 2014/0269505 A1 | 9/2014 | Medard et al. | |
| 2014/0280395 A1 | 9/2014 | Medard et al. | |
| 2014/0280454 A1 | 9/2014 | Medard et al. | |

FOREIGN PATENT DOCUMENTS

| | | |
|---|---|---|
| WO | WO 2010/005181 A2 | 1/2010 |
| WO | WO 2010/005181 A3 | 1/2010 |
| WO | WO 2010/025362 A2 | 3/2010 |
| WO | WO 2010/025362 A3 | 3/2010 |
| WO | WO 2011/043754 A1 | 4/2011 |
| WO | WO 2011/119909 A | 9/2011 |
| WO | WO 2011/119909 A1 | 9/2011 |
| WO | WO 2012/167034 A2 | 12/2012 |
| WO | WO 2013/006697 A2 | 1/2013 |
| WO | WO 2013/067488 A1 | 5/2013 |
| WO | WO 2013/116456 A1 | 8/2013 |
| WO | WO 2014/159570 A1 | 10/2014 |
| WO | WO 2014/160194 A3 | 10/2014 |

OTHER PUBLICATIONS

U.S. Appl. No. 13/655,034, filed Oct. 18, 2012, Medard et al.
U.S. Appl. No. 13/890,604, filed May 9, 2013, Zeger, et al.
U.S. Appl. No. 14/208,683, filed Mar. 13, 2014, Calmon, et al.
Adamson, et al.; "Multicast Negative-Acknowledgment (NACK) Building Blocks;" Internet Engineering Task Force (IETF),RFC; vol. 5401; Nov. 2008; 42 pages.
Adamson, et al.; "NACK-Oriented Reliable (NORM) Transport Protocol," Internet Engineering Task Force (IETF); RFC; vol. 5740; Nov. 2009; 94 pages.
Adamson, et al.; "Quantitative Prediction of NACK-Oriented Reliable Multicast (NORM) Feedback;" Proceedings, MILCOM, 2000; vol. 2; Oct. 2002; 6 pages.
Chou, et al.; "FEC and Pseudo-ARQ for Receiver-driven Layered Muiticast of Audio and Video;" Data Compression Conference (DCC), 2000; Proceedings; Jan. 2000; 10 pages.
Larsson; "Multicast Multiuser ARQ;" Wireless Communications and Networking Conference (WCNC) 2008; IEEE; Apr. 3, 2008; pp. 1985-1990.
Luby, et al.; "The Use of Forward Error Correction (FEC) in Reliable Multicast;" Internet Society Request for Comments; RFC 3453; Dec. 2002; 18 pages.
Lucani, et al.; "On Coding for Delay—New Approaches Based on Network Coding in Networks with Large Latency;" Information Theory and Application Workshop; Jan. 2009; 10 pages.
Rezaee, et al.; "An Analysis of Speeding Multicast by Acknowledgment Reduction Technique (SMART) with Homogeneous and Heterogeneous Links—A Method of Types Approach;" Signals, Systems and Computers (ASILOMAR) 2011 Conference; IEEE; Nov. 2011; pp. 21-27.
Rezaee; "Network Coding, Multi-Packet Reception, and Feedback: Design Tools for Wireless Broadcast Networks;" Submitted to Department of Electrical Engineering and Computer Science at Massachusetts Institute of Technology; Sep. 2011; 92 pages.
Rezaee, et al.; "Speeding Multicast by Acknowledgment Reduction Technique (SMART);" Global Telecommunications Conference (GLOBECOM 2011); IEEE; Dec. 2011; 6 pages.
Rezaee, et al.; "Speeding Multicast by Acknowledgment Reduction Technique (SMART) Enabling Robustness of QoE to the Number of Users;" IEEE Journal on Selected Areas in Communication; vol. 30, No. 7; Aug. 2012; pp. 1270-1280.
Sundararajan, et al.; "Network coding meets TCP;" IEEE INFOCOM 2009 proceedings; Apr. 2009; pp. 280-288.
U.S. Appl. No. 14/297,090, filed Jun. 5, 2014, Kim, et al.
U.S. Appl. No. 14/678,359, filed Apr. 3, 2015, Zeger, et al.
U.S. Appl. No. 14/668,185, filed Mar. 25, 2015, Medard, et al.
"Data Service Options for Spread Spectrum Systems: Radio link Protocol Type 3;" 3GPP2 C.S0017-010-A; Version 2.0; Sep. 2005.
"Guest Editorial Wireless Video Transmission;" IEEE Journal on Selected Areas in Communications; vol. 28; No. 3; Apr. 2010; pp. 297-298.

(56) References Cited

OTHER PUBLICATIONS

Abichar, et al.; "WiMax vs. LTE: Who Will Lead the Boradband Mobile Internet?;" Mobile Computing; IEEE Computer Society; IT Pro May/Jun. 2010; pp. 26-32.

AbuZeid, et al.; "IR-HARQ vs. Joint Channel-Network Coding for Cooperative Wireless Communication;" Cyber Journals: Multidisciplinary Journals in Science and Technology, Journal of Selected Areas in Telecommunications (JSAT); Aug. 2011; pp. 39-43.

Acedanski, et al.; "How Good is Random Linear Coding Based Distributed network Storage?," Proc. $1^{st}$ Workshop on Network Coding Theory, and Applications (Netcod'05); Apr. 2005; 6 pages.

Adamson, et al.; "NACK-Oriented Reliable (NORM) Transport Protocol;" Internet Engineering Task Force (IETF); RFC; vol. 5740; Nov. 2009; 94 pages.

Adamson, et al.; "Quantitative Prediction of NACK-Oriented Reliable Multicast (NORM) Feedback;" Proceedings, MILCOM 2000; vol. 2; Oct. 2002; 6 pages.

Ahlswede, et al.; "Network Information Flow;" IEEE Transaction on Information Theory; vol. 46; No. 4; Jul. 2000; pp. 1204-1216.

Ahmed, et al.; "On the Scaling Law of Network Coding Gains in Wireless Networks;" IEEE; MILCOM 2007; Oct. 2007; 7 pages.

Allman, et al.; "Fast Retransmit / Fast Recovery—TCP Congestion Control;" IETF; Section 3.2; RFC 2581; http://tool.ietf.org/html/rfc2581#section-3.2; Apr. 1999; downloaded on Nov. 2, 2011; 14 pages.

Armstrong, et al.; "Distributed Storage with Communcation Costs;" IEEE Forty-Ninth Annual Allerton Conference—Allerton House; Sep. 28-30, 2011; pp. 1358-1365.

Awerbuch, et al.; "On-Line Generalized Steiner Problem;" Proceedings of the $7^{th}$ Annual ACM-SIAM Symposium on Discrete Algorithms; pp. 1-12; 1996.

Baek, et al.; "The International Journal of Computer and Telecommunications Networking;" vol. 56; Issue 6; Apr. 2012; pp. 1745-1762.

Baron, et al.; "Coding Schemes for Multislot Messages in Multichannel ALOHA With Deadiines," IEEE Transactions on Wireless Communications; vol. 1; No. 2; Apr. 2002; pp. 292-301.

Bellare, et al.; "A Concrete Security Treatment of Symmetric Encryption: Analysis of the DES Modes of Operation;" Proc. $38^{th}$ Annual Symposium on Foundations of Computer Science; Oct. 1997; pp. 1-32.

Bhadra, et al,; "Looking at Large Networks: Coding vs. Queuing;" Proc. of the $25^{th}$ IEEE International Conference on Computer Communications (INFOCOM); Apr. 2006; 12 pages.

Bharath-Kumar, et al.; "Routing to Multiple Destinations in Computer Networks;" IEEE Transactions on Communications; vol. Com-31; No. 3; Mar. 1983; pp. 343-351.

Bhargava, et al., "Forward Error Correction Coding," Mobile Communications Handbook; Part 1: Basic Principals; 1999; 18 pages.

Birk, et al.; "Judicious Use of Redundant Transmissions in Muitichannel ALOHA Networks with Deadlines;" IEEE Journal on Selected Areas in Communications; vol. 17; No. 2; Feb. 1999; pp. 257-269.

Bisson, et al.; "Reducing Hybrid Disk Write Latency with Flash-Backed I/O Requests;" Proceedings of the Fifteenth IEEE International Symposium on Modeling, Analysis, and Simulation of Computer and Telecommunications Systems (MASCOTS'07); Oct. 2007; pp. 402-409.

Bonnin, et al.; "Automatic Multi-Interface Management Through Profile Handling;" Springer; Mobile Networks and Applications; Feb. 2009; pp. 4-17.

Borokhovich, et al.; "Tight bounds for Algebraic Gossip on Graphs;" Proc. of the IEEE International Symposium on Information Theory (ISIT); Jun. 13-18, 2010; 14 pages.

Borst, et al.; "Distributed Caching Algorithms for Content Distribution Networks"; IEEE INFOCOM; 2010 Proceedings IEEE; Mar. 14-19, 2010; 9 pages.

Borst, et al.; "Distributed Caching Algorithms for Content Distribution Networks;" Power Point Presentation; BCAM Seminar; Bilbao, Sep. 30, 2010; 36 pages.

Bui, et al.; "A Markovian Approach to Multipath Data Transfer in Oveday Networks;" IEEE Transactions on Parallel and Distributed Systems; vol. 21; No. 10; Oct. 2010; pp. 1398-1411.

Cai et al.; "Secure Network Codng;" IEEE; ISIT; Jun. 30-Jul. 5, 202; p. 323.

Calmon, et al.; "Network Coding Over Multiple Network Interfaces Using TCP;" Presentation; Information Theory and Applications Workshop (ITA) 2012; San Diego, CA; Feb. 5 2012; 55 pages.

Cardinal, et al; "Minimum Entrophy Combinatorial Optimization Problems;" Data Structure and Algorithms, Discrete Mathematics; Aug. 17, 2010; pp. 1-16.

Castro, et al.; "Upper and Lower Error Bounds for Active Learning;" The 44'th Annual Allerton Conference on Communication, Control and Computing; vol. 2, No. 2.1; 2006, 10 pages.

Celik, et al.; "MAC for Networks with Multipacket Reception Capability and Spatially Distributed Nodes;" Proc. IEEE INFOCOM 2008; Apr. 2008; 9 pages.

Celik; "Distributed MAC Protocol for Networks with Multipacket Reception Capability and Spatially Distributed Nodes;" Master's Thesis; MIT Department of Electrical Engineering and Computer Science; May 2007; 127 pages.

Cha, et al.; "I Tube, You Tube, Everybody Tubes: Analyzing the World's Largest User Generated Content Video System;" $7^{th}$ ACM GIGCOMM Conference on Internet Measurement; IMC'07; Oct. 24-26, 2007; 13 pages.

Chakrabarti, et al.; "Approximation Algorithms for the Unsplittable Flow Problem;" Proceedings of the $5^{th}$ International Workshop on Approximation Algorithms for Combinatorial Optimization; Sep. 2005, pp. 1-27.

Chakrabarti, et al.; Approximation Algorithms for the Unsplittable Flow Problem; Algorithmica (2007); Springer Science—Business Media, Aug. 2006; 16 pages.

Charikar, et al.; "Approximation Algorithms for Directed Steiner Problems;" Procedings of the $9^{th}$ ACM-SIAM Symposium on Discrete Algorithms, pp. 1-15; 1998.

Chen, et al.; "Pipeline Network Coding for Multicast Streams;" ICMU Org.; 2010; 7 pages.

Chou, et al,: "FEC and Pseudo-ARQ for Receiver-driven Layered Multicast of Audio and Video;" Date Compression Conference (DCC), 2000; Proceedings; Jan. 2000; 10 pages.

Chou, et al; "Practical Network Coding;" Proceedings of the $41^{st}$ Annual Allerton Conference on Communication, Control, and Computing; Oct. 2003; 10 pages.

Cisco Visual Networking Index: Forcast and Methodology; 2009-2014; White Paper; Jun. 2, 2010; pp. 1-17.

Cloud, et al.; "Co-Designing Multi-Packet Reception, Network Coding, and MAC Using a Simple Predictive Model;" arXiv:1101.5779v1 [cs.NI]; Submitted to W.Opt 2011;Jan. 30, 2011; pp. 1-8.

Cloud, et al.; "Effects of MAC approaches on non-montonic saturation with COPE—a simple case study;" Military Communication Conference, 2011—MILCOM; Aug. 11, 2011; 7 pages.

Cloud, et al.; "MAC Centered Cooperation—Synergistic Design of Network Coding, Multi-Packet Reception, and Improved Fairness to Increase Network Throughput," IEEE Journal on Selected Areas in Communcations; vol. 30; No. 2; Feb. 2012; pp. 1-8.

Cloud, et al.; "Muiti-Path TCP with Network Coding;" Wireless@mit—MIT Center for Wireless Networks and Mobile Computing; 2012 Inaugural Retreat; Oct. 10-11, 2012.

Cloud, et al; U.S. Appl. No. 13/654,953, filed Oct. 18, 2012.

Costa, et al.; "Informed Network Coding for Minimum Decoding Delay;" Fifth IEEE International Conference on Mobile Ad-hoc and Sensor Systems; Sep. 2008; pp. 80-91.

Coughlin, et al.; Years of Destiny: HDD Capital Spending and Technology Developments from 2012-2016; IEEE Santa Clara Valley Magnetics Society; Jun. 19, 2012; pp. 1-28.

Dana, et al.; "Capacity of Wireless Erasure Networks;" IEEE Transactions on Information Theory; vol. 52; No. 3; Mar. 2006; pp. 789-804.

Dana, et al.; "Capacity of Wireless Erasure Networks;" Jan. 2006; 41 pages.

(56) References Cited

OTHER PUBLICATIONS

Deb, et al.; "Algebraic Gossip: A Network Coding Approach to Optimal Multiple Rumor Mongering;" Proc. of the 42$^{nd}$ Allerton Conference on Communication, control, and computing; Jan. 2004; 10 pages.

Deb, et al.; "On Random Network Coding Based Information Dissemination;" Proc. of the IEEE International Symposium on Information Theory (ISIT); Sep. 4-9, 2005; 5 pages.

Demers, et al.; "Epidemic Algorithms for Replicated Database Maintenance;" PODC '87 Proceedings of the sixth annual ACM Symposium on Principles of distributed computing; Jan. 1987; pp. 1-12.

Dias, et al.; "Performance Analysis of HARQ in WiMax Networks Considering Imperfect Channel Estimation;" The 7$^{th}$ International Telecommunications Symposium (ISTS 2010); 2010; 5 pages.

Dimakis, et al.; "A Survey on Network Codes for Distributed Storage;" Proceedings of the IEEE, vol. 99; No. 3; Mar. 2011; pp. 476-489.

Donoho, et al.; "Estimating Covariances of Locally Stationary Processes: Rates of Convergence of Best Basis Methods;" Statistics, Stanford University, Stanford, California, USA, Tech. Rep; 1998; pp. 1-64.

Effros; "Universal Multiresolution Source Codes;" IEEE Transactions on Information Theory; vol. 47; No. 6; Sep. 2001; pp. 2113-2129.

Effros; Distortion-Rate Bounds for Fixed- and Variable-Rate Multiresolution Source Codes; IEEE Transactions on Information Theory; vol. 45, No. 6; Sep. 1999; pp. 1887-1910.

El Bahri, et al.; "Performarme Comparison of Type I, II and III Hybrid ARQ Schemes over AWGN Channels;" 2004 IEEE International Conference on Indusitrial Technology (ICIT); vol. 3; Dec. 8-10, 2004; pp. 1417-1421.

Eryilmaz, et al.; On Delay Peformance Gains From Network Coding; Information Sciences and Systems; 2006 40$^{th}$ Annual Conference on Mar. 22-24, 2006; 7 pages.

Fan, et al.; "Reliable Relay Assisted Wireless Multicast Using Network Coding;" IEEE Journal on Selected Areas in communications; vol. 27; No. 5; Jun. 2009; pp. 749-762.

Feizi, et al.; "Locally Adaptive Sampling;" Communication, Control, and Computing; 2010; 48$^{th}$ Annual Allerton Conference, IEEE; Sep. 29, 2010; pp. 152-159.

Feizi, et al.; "On Network Functional Compression;" arXiv online repository; URL: http://arxiv.org/pdf/1011.5496v2.pdf; Nov. 30, 2010p pp. 1-60.

Feizi, et al.; "When Do Only Sources Need to Compute? On Functional Compression in Tree Networks;" 47$^{th}$ Annual Allerton Conference, IEEE; Sep. 30, 2009; pp. 447-454.

Feizi, et al; "Cases Where Finding a Minimum Entropy Coloring of a Characteristic Graph is a Polynomial Time Problem;" IEEE International Symposium on Information Theory; Jun. 13, 2010; pp. 116-120.

Ferner, et al.; "Toward Sustainable Networking: Storage Area Networks with Network Coding;" Fiftieth Annual Allerton Conference; IEEE; Oct. 1-5, 2012; pp. 517-524.

Ford; "Architectural Guidelines for Muitipath TCP Development;" Internet Engineering Task Force; Internet-Draft; Dec. 8, 2010; 17 pages.

Ford; "TCP Extension for Multipath Operation with Multiple Addresses draft-ford-mptcp-multiaddressed-03;" Internet Engineering Task Force; Internet-Draft; Mar. 8, 2010; 35 pages.

Fragouli, et al.; "Wireless Network Coding: Opportunities & Challenges;" MILCOM; Oct. 2007; 8 pages.

Frossard, et al.; "Media Streaming With Network Diversity;" Invited Paper; Proceedings of the IEEE; vol. 96, No. 1; Jan. 2008; pp. 39-53.

Galbraith, et al.; (HGST); "Iterative Detection Read Channel Technology in Hard Disk Drives;" Whitepaper; Nov. 2008; 8 pages.

Garcia-Luna-Aceves; "Challenges: Towards Truly Scalable Ad Hoc Networks;" MobiCom 2007; Sep. 2007; pp. 207-214.

Garcia-Luna-Aceves; "Extending the Capacity of Ad Hoc Networks Beyond Network Coding;" IWCMC 07; Proceedings of the 2007 International Conference on Wireless Communications and Mobile Computing; ACM; 2007; pp. 91-96.

Ghaderi, et al.; Reliability Gain of Network Coding in Lossy Wireless Networks; Infocom 2008; The 27$^{th}$ Conference on Computer Communications IEEE; Apr. 13-18, 2008; 5 pages.

Gheorghiu, et al.; "Multipath TCP with Network Coding for Wireless Mesh Networks;" IEEE Communications (ICC) 2010 International Conference; May 23-27, 2010; 5 pages.

Gheorghiu, et al.; "On the Performance of Network Coding in Multi-Resolution Wireless Video Streaming;" IEEE International Symposium on Jun. 9-11, 2010; 6 pages.

Ghez, et al.; "Stabiiity Properties of Slotted Aloha with Muitipacket Reception Capability;" IEEE Transactions on Automatic Control; vol. 33; No. 7; Jul. 1988; pp. 640-649.

Gkantsidis, et al.; "Cooperative Security for Network Coding File Distribution:" Proc. IEEE Infocom; Apr. 2006; 13 pages.

Gollakota, et al.; "ZigZag Decoding: Combating Hidden Terminals in Wireless Networks;" SIGCOMM 08; Aug. 17-22; pp. 159-170.

Golrezaei, et al.; "FemtoCaching: Wireless Video Content Delivery Through Distributed Caching Helpers;" arXiv:1109.4179v2; Apr. 7, 2012; pp. 1-11.

Grant, et al.; "Graph Implementation for Nonsmooth Convex Programs;" LNCIS 371; Springer-Verlag Lmited; Jan. 2008; pp. 95-110.

Gupta; "The Capacity of Wireless Networks;" IEEE Transactions on Information Theory; vol. 46 No. 2; Mar. 2000; pp. 388-404.

Hadzi-Velkov, et al.; "Capture Effect in IEEE 802.11 Basic Service Area Under Influence of Rayleigh Fading and Near/Far Effect;" IEEE; PIMRC 202; vol. 1; Sep. 2002; 5 pages.

Haeupler et al.; "One Packet Suffices—Highly Efficient Packetized Network Coding With Finite Memory;" IEEE International Symposium on Information Theory (ISIT) Proceedings; Jul. 31, 2011-Aug. 5, 2011; 5 pages.

Haeupler; "Analyzing Network Coding Gossip Made Easy;" Proc. of the 43$^{rd}$ Symposium on Theory of Computing (STOC); Jan. 2011, 13 pages.

Haeupler, et al.; "Optimality of Network Coding in Packet Networks;" ArXiv, Feb. 17, 2011; 5 pages.

Haley, et al.; "Reversible low Density parity-Check Codes;" IEEE Transactions on Information Theory; vol. 55; No. 5; May 2009; pp. 2016-2036.

Halloush et al.; "Network Coding with Multi-Generation Mixing; Analysis and Applications for Video Communication;" IEEE International Conference on Communications; May 19, 2008; pp. 198-202.

Han, et al.; "Multi-Path TCP: A Joint Congestion Control and Routing Scheme to Exploit Path Diversity in the Internet;" IEEE/ACM Transactions on Networking (TON); vol. 14; No. 6, Dec. 2006; 26 pages.

Han et al.; "On Network Coding for Security;" IEEE Military Communications Conference; Oct. 2007; pp. 1-6.

Hassner et al.; "4K Bye-Sector HDD-Data Format Standard;" Windows Hardware and Driver Central; San Jose, CA; Aug. 14, 2013; 5 pages.

Ho, et al.; "A Random Linear Network Coding Approach to Multicast;" IEEE Transactions on Information Theory; vol. 52; No. 10; Oct. 2006, pp. 4413-4430.

Ho, et al.; "Byzantine Modification Detection in Multicast Networks using Randomized Network Coding;" IEEE; ISIT; Jun. 27-Jul. 2, 2004; p. 144.

Ho, et al.; "Network Coding from a Network Flow Perspective;" ISIT; Jun.-Jul. 2003; 6 pages.

Ho, et al.; "On Randomized Network Coding;" Proceedings of 41$^{st}$ Annual Allerton Conference on Communications, Control and Computing; Oct. 2003; 10 pages.

Ho, et al.: "On the utility of network coding in dynamic environments;" International Workshop on Wireless Ad-Hoc Networks (IWWAN); 2004; pp. 1-5.

Ho, et al.; "The Benefits of Coding over Routing in a Randomized Setting;" Proceedings of 2003 IEEE International Symposium on Information Theory; Jun. 2003; pp. 1-6.

Ho, et al.; "The Benefits of Coding over Routing in a Randomized Setting;" IEEE; ISIT Jun. 29-Jul. 4, 2003; p. 442.

(56) References Cited

OTHER PUBLICATIONS

Hofri; "Disk Scheduling; FCFS vs. SSTF Revisited;" Communications of the ACM; vol. 23; No. 11; Nov. 1980; pp. 645-653.
Hong, et al.; Network-coding-based hybrid ARQ scheme for mobile relay networks; Electronics Letter; vol. 46; No. 7; Apr. 1, 2010; 2 pages.
International Disk Drive Equipment and Materials Assoc.; "Advanced Standard;" in Windows Hardware Engineering Conf.; May 2005; 11 pages.
Iyer, et al.; "Anticipatory scheduling: A disk scheduling framework to overcome deceptive idleness in synchronous I/O;" SIGOPS Operating Sys. Review; vol. 35; No. 5; Dec. 2001; 14 pages.
Jacobson, et al.; "Disk scheduling algorithms based on rotational position;" Hewlett-Packard laboratories; Palo Alto, CA; Technical Report HPL-CSP-91-7rev1; Feb. 26, 1991; 17 pages.
Jaggi, et al.; "Low Complexity Algebraic Multicast Network Codes;" Proceedings of the IEEE International Symposium on Information Theory; Jul. 4, 2003; 1 page.
Jaggi, et al.; "Resilient Network Coding in the Presence of Byzantine Adversaries;" Proc. IEEE INFOCOM; May 2007; 9 pages.
Jakubczak, et al.; "One-Size-Fits-All Wireless Video;" ACM SigComm Hotnets 2009; 6 pages.
Jamieson, et al.; "PPR: Partial Packet Recovery for Wireless Networks;" SIGCOMM 07; Aug. 27-31, 2007; 12 pages.
Jamieson, et al.; "PPR: Partial Packet Recovery for Wireless Networks;" Presentation: SIGCOMM 07; Aug. 27-31, 2007; 25 pages.
Jannaty, et al.; "Full Two-Dimensional Markov Chain Analysis of Thermal Soft Errors in Subthreshold Nanoscale CMOS Devices;" IEEE Transactions on Device and Materials Reliability; vol. 11; No. 1; Mar. 2011; pp. 50-59.
Ji, et. al; "A network coding based hybrid ARQ algorithm for wireless video broadcast;" Sciences China; Information Sciences; vol. 54; No. 6; Jun. 2011; pp. 1327-1332.
Jin, et al.; "Adaptive Random Network Coding in WiMAX;" Communications, 2008; ICC'08 IEEE International Conference on May 19-23, 2008; 5 pages.
Jin, et al.; "Is Random Network Coding Helpfull in WiMax;" IEEE $27^{th}$ Conference on Computer Comunicatons; Apr. 2008; 5 pages.
Jolfaei, et al.; "A New Efficient Selective Repeat Protocol for Point-to_Multipoint Communication;" Communications 1993; ICC'93 Genova Technical Program, Conference Record; IEEE International Conference on May 23-26, 1993; vol. 2; pp. 1113-1117.
Karkpinski, et al.; "New Appmximation Algorithms for the Steiner Tree Problems;" Technical Report, Electronic Colloquium on Computational Complexity (ECCC) TR95-030; 1995; pp. 1-17.
Karp, et al.; "Randomized Rumor Spreading;" IEEE Proceeding FOCS '00 Proceedings of the 41st Annual Symposium on Foundations of Computer Science; Jan. 2000; pp. 565-574.
Katti, et al.; "XORs in the Air; Practical Wireless Network Coding;" IEEE/ACM Transactions on Networking; vol. 16; No. 3; 2008; pp. 1-14.
Katti, et al.; "XORs in the Air: Practcal Wireless Network Coding;" ACM SIGCOMM '06; Computer Communications Review; vol. 36; Sep. 11-15, 2006; 12 pages.
Kempe et al.; "Protocols and Impossibility Results for Gossip-Based Communication Mechanisms;" Foundations of Computer Science, Jan. 2002; Proceedings. The $43^{rd}$ Annual IEEE Symposium; pp. 471-480.
Key, et al.; "Combining Multipath Routing and Congestion Control for Robustness;" In Proceedings of IEEE CISS, 2006, 6 pages.
Kim, et al.; "Modeling Network Coded TCP Throughout: A Simple Model and its validation;" VALUETOOLS '11 Proceedings of the $5^{th}$ International ICST Conference on Performance Evaluation Methodologies and Tools; May 16-20, 2011; 10 pages.
Kim, et al.; "Modeling Network Coded TCP Throughout: A Simple Model and its Validation", Cornell University Library, http://arxiv.org/labs/1008.0420, Aug. 2010, 3 pages.
Kim, et al.; "Network Coding for Multi-Resolution multicst;" IEEE INFOCOM 2010; Mar. 2010; 9 pages.

Kim, et al.; "Transform-free analysis of the GI/G/1/K queue through the decomposed Little's formula;" Computers and Operations Research; vol. 30; No. 3; Mar. 2003; pp. 1-20.
Kim, et al.; "Modeling Network Coded TCP Throughput: A Simple Model and its Validation", arXiv:1008.0420v1 [cs.IT] Aug. 2, 2010; 9 pages.
Kim, et al.; "Modeling Network Coded TCP Throughput: A Simple Model and its Validation", Nov. 2010, Presentation; 19 pages.
Kodialam et al.; "Online Multicast Routing With Bandwidth Guarantees: A New Approach Using Multicast Network Flow," IEEE/ACM Transactions on Networking; vol. 11; No. 4; Aug. 2003; pp. 676-686.
Koetter, et al.; "An Algebraic Approach to Network Coding;" IEEE/ACM Transactions on Networking; vol. 11, No. 5; Oct. 2003; pp. 782-795.
Koetter, et al.; "Beyond Routing: An Algebraic Approach to Network Coding;" IEEE Infocom; 2002; 9 pages.
Koutsonikolas, et al.; "Efficient Online WiFi Delivery of Layered-Coding using Inter-layer Network Coding;" Distributed Computing Systems (ICDCS); 2011 $31^{st}$ International Conference on Jun. 2011; 11 pages.
Kritzner, et al.; "Priority Based Packet Scheduling with Tunable Reliability for Wireless Streaming;" Lecture Notes in Computer Science; 2004; pp. 707-717.
Kuhn, et al.; "Distributed Computation in Dynamic Networks;" Proc of the $42^{nd}$ Symposium on Theory of Computing (STOC); Jun. 5-8, 2010; 10 pages.
Lai; "Sequential Analysis: Some Classical Problems and New Challenges"; Statistica Sinica, vol. 11, No. 2; 2001; pp. 303-350.
Landau; "Application of the Volterra Series to the Analysis and Design of an Angle Track Loop;" IEEE Transaction on Aerospace and Electronic Systems; vol. AES-8, No. 3; May 1972; pp. 306-318.
Larsson, et al.: "Analysis of Network Coded HARQ for Multiple Unicast Flows;" Communication (ICC) 2010 IEEE International Conference on May 23-27, 2010, pp. 1-6.
Larsson, et al.; "Multi-User ARQ" Vehicular Technology Conference; 2006; VTC (2006-Spring); IEEE $63^{rd}$; vol. 4; May 7-10, 2006; pp. 2052-2057.
Larsson; "Analysis of Multi-User ARQ with Multiple Unicast Flows Under Non-iid Reception Probabilities;" Wireless Communication and Networking Conference 2007; WCNC 2007; IEEE; Mar. 11-15, 2007; pp. 384-388.
Larsson; "Multicast Multiuser ARQ;" Wreless Communications and Networking Conference (WCNC) 2008; Apr. 3, 2008; pp. 1985-1990.
Le et al.; "How Many Packets Can We Encode?—An Analysis of Practical Wireless Network Coding;" INFOCOM 2008; The $27^{th}$ Conference on Computer Communications, IEEE; 2008; pp. 1040-1048.
Lee, et al.; "Content Distribution in VANETs using Network Coding: The Effect of Disk I/O and Processing O/H;" Proc. IEEE SECON; Jan. 2008; pp. 117-125.
Lehman, et al; Complexity Classification of Network Information Flow Problems SODA 04' Proceedings of the fifteenth annual ACM-SIAM symposium on Discrete algorithms; Jan. 2004; pp. 9-10.
Li, et al.; "N-in-1 Retransmission with Network Coding;" IEEE Transactions on Wieless Communications; vol. 9; No. 9; Sep. 2010; pp. 2689-2694.
Li, et al.; "Robust and Flexible Scalable Video Multicast with Network Coding over P2P Network;" $2^{nd}$ International Congress on Image and Signal Processing, IEEE: Oct. 17, 2009; pp. 1-5.
Li,et al.; "Linear Network Coding;" IEEE Transactions on Information Theory; vol. 49; No. 2; Feb. 2003; pp. 371-381.
Lima, et al.; "An Information-Theoretic of Network Coding—is Protecting the Code Enough;" International Symposium on Information Theory and its Applications; Dec. 2008; 6 pages.
Lima, et al.; "Random Linear Network Coding: A free cipher?" IEEE International Symposium on Information Theory; Jun. 2007; pp. 1-5.
Lima, et al.; "Secure Network Coding for Multi-Resolution Wireless Video Streaming;" IEEE Journal on Selected Areas in Communcations; vol. 28; No. 3; Apr. 2010; pp. 377-388.
Lima, et al.; "Towards Secure Multiresolution Network Coding;" IEEE Information Theory Workshop; Jun. 12, 2009; pp. 125-129.

(56) References Cited

OTHER PUBLICATIONS

Liu, et al.; "The Throughput Order of Ad Hoc Networks Network Coding and Broadcasting" Military Communications Conference; MILCOM 2006; Oct. 2006; pp. 1-7.
Liu, et al.; "Using Layered Video to Provide Incentives in P2P Live Streaming;" P2P-TV07: Proceedings of the 2007 Workshop on Peer-to-peer Streaming and IP-TV; Aug. 31, 2007 ACM; 6 pages.
Lucani et al.; "On Coding for Delay New Approaches based on Network Coding in Network Coding in Networks with Large Latency;" Presentation in NetCod; Slide Presentation; Jun. 16, 2009; 17 pages.
Lucani et al; "Broadcasting in Time-Division Dupexing: A Random Linear Network Coding Approach;" presented Switzerland; Conference: NetCod 2009, Lausanne, Swtzerland; Jun. 2009; 6 pages.
Lucani et al; "On Coding for Delay—New Approaches Based on Network Coding in Networks with Large Latency;" Conference: ITA Workshop, San Diego, USA; Feb. 2009; 10 pages.
Lucani et al; "On coding for Delay New Approaches based on Network Coding in Network's with Large Latency;" Conference ITA Workshop, San Diego, USA; Slide Presentaton; Feb. 13, 2009; 11 pages.
Lucani et al; "Random Linear Network Coding for Time Division Duplexing: Energy Analysis;" Conference: ICC 2009, Dresden, Germany; Jun. 2000; 5 pages.
Lucani et al; "Random Linear Network Coding for Time-Division Duplexing: when to stop talking and start listening;" Presentation in ICC; Slide Presentaton; Jun. 16, 2009; 6 pages.
Lucani et al; "Random Linear Network Codng for Time-Division Dupexing: when to stop talking and start listening;" Presentation in INFOCOM; Slide Presentation; Apr. 23, 2009; 10 pages.
Lucani et al; "Random Linear Network Coding for Time-Divison Duplexing: Queueing Analysis;" Conference ISIT 2009, Seoul, Korea; Jul. 2009; 5 pages.
Lucani et al; "Random Linear Network Coding for Time-Division Duplexing: Field Size Considerations;" Conference: GLOBECOM 2009, Hawaii, USA; Dec. 2009; 6 pages.
Lucani et al.; "Network Coding for Data Dissemination: It Is Not What You Know, But What Your Neighbors Don't Know;" Modeling and Optimization in Mobile AdHoc and Wireless Networks 2009; WiOPT 2009; 7th International Symposium on Jun. 23-27, 2009; pp. 1-8.
Lucani, et al.; "Network Coding Schemes for Underwater Networks;" WUWNet 07; Sep. 14, 2007; pp. 25-32.
Lucani, et al.; Systematic Network Coding for Time-Division Duplexing; Proceedings of the IEEE International Symposium on Information Theory (ISIT); ; Jun. 13-18, 2010; pp. 2403-2407.
Lun, et al.; "Further Results on Coding for Reliable Communication over Packet Networks;" Information Theory, ISIT 2005 Proceedings International Symposium on Sep. 4-9, 2005; 5 pages.
Lun, et al.; "On Coding for Reliable Communication Over Packet Networks;" Physical Communication; vol. 1; No. 1; Jan. 2008; pp. 10 pages.
Lun, et al.; "On Coding for Reliable Communication over Packet Networks;" LIDS Publication #2741; Jan. 2007; 33 pages.
Lun et al.; An Analysis of Finite-Memory Random Linear Coding on Packet Streams; Modeling and Optimization in Mobile, Ad Hoc and Wireless Networks; Apr. 3-6, 2006; pp. 1-6.
Lun; "Efficient Operation of Coded Packet Networkers;" Ph.D. Dissertation; Massachusetts Institute of Technology; Jun. 2006; 130 pages.
Magli, et al.; "An Overview of Network Coding for Multimedia Streaming;" IEEE International Conference; Jun. 28, 2009; pp. 1488-1491.
Mallat, et al.; "Adaptive Covariance Estimation of Locally Stationary Processes," Annals of Statstics, vol. 26, No, 1; 1998; pp. 1-43.
Manssour, et al.; "A Unicast Retransmission Scheme based on Network Coding;" IEEE Transactions on Vehicular Technology; vol. 61; Issue 2; Nov. 2011; 7 pages.

Maymounkov, et al.; "Methods for Efficient Network Coding;" Proc. of the 44th Allerton Conference on Communication, Control, and Computing; Sep. 2006; 10 pages.
Médard, et al.; "On Coding for Non-Multicast Networks;" invited paper, 41st Allerton Annual Conference on Communication, Control; Outgrowth of supervised student research Publications of Muriel Médard and Computing; vol. 1; Oct. 2003; 9 pages.
Medard; "Some New Directions for Network Coding in Content Distribution", RLE, EECS, MIT, Seminar to Alcatel Lucent, Nov. 2010, 29 pages.
Merchant, et al.; "Analytic Modeling of Clustered RAID with Mapping Based on Nearly Random Permutation;" IEEE Transactions on Computers; vol. 45; No. 3 Mar. 1996; pp. 367-373.
Metzner; "An improved Broadcast Retransmission Protocol;" IEEE Transactions on Communications; vol. COM-32; No. 6; Jun. 1984; pp. 679-683.
Mosk-Aoyama, et al.; "Information Dissemination via Network Coding;" ISIT 2006; IEEE; Jul. 9-14, 2006; pp. 1748-1752.
Moyer, et al.; "A Survey of Security Issues in Multicast Communications;" IEEE Network; vol. 13; No. 6; Nov./Dec. 1999; pp. 12-23.
Nguyen, et al.; "Internet Media Streaming Using Network Coding and Path Diversity;" IEEE Global Telecommunications Conference; Nov. 30-Dec. 4, 2008; 5 pages.
Nguyen, et al.; "Wireless Broadcast Using Network Coding;" Vehicular Technology IEEE Transactions on Feb. 2009; vol. 58; Issue 2; 25 pages.
Nguyen; et al; "Video Streaming with Network Coding;" Journal of Signal Processing Systems; vol. 59, Issue 3; DOI: 10.1007/s11265-009-0342-7; Jun. 2010; 25 pages.
Nobel; "Hypothesis Testing for Families of Ergodic Processes;" Bernoulli-London, vol. 12, No. 2; 2006; 21 pages.
Noguichi, et al.; "Performance Evaluation of New Multicast Architecture with Network Coding;" IEICE Transactions on Communication, E86-B; No. 6; Jun. 2003; 3 pages.
NS Version 1—LBNL Network Simulator; web page—http://ee.lel.gov/ns/; Mar. 21, 2011; 3 pages.
Nyandoro, et al.; "Service Differentiation in Wireless LANs based on Capture" IEEE GLOBECOM 2005; vol. 6; Dec. 2005; 5 pages.
Oliveira, et al.; "A Network Coding Approach to Secret Key Distribution;" IEEE Transactions on Information Forensics and Security: vol. 3; No. 3; pp. 414-423; Sep. 2008.
ParandehGheibi, et al.; "Access-Network Association Policies for Media Streaming in Heterogeneous Environments;" Apr. 2010; pp. 1-8.
Peng, et al.; "Research on Network Coding based Hybrid-ARQ Scheme for Wireless Networks;"0 Communications Systems (ICCS); 2010 IEEE International Conference on Nov. 17-19, 2010; pp. 218-222.
Popovici et al.; "Robust Portable I/O Scheduling with the Disk Mimic;" Proc. USENIX Annual Tech. Conf. San Antonio, Texas, Jun. 2003; 14 pages.
Qureshi, et al.; "An Efficient Network Coding based Retransmission Algorithm for Wireless Multicast;" Personal Indoor and Mobile Radio Communications, 2009 IEEE 20th International Symposium on Sep. 13-16, 2000; 5 pages.
Radunovic, et al.; "Horizon: Balancing TCP Over Multiple Paths in Wireless Mesh Network;" Proc. 14th ACM International Conference on Mobile Computing and Networking; Sep. 2008; 12 pages.
Ramanathan; "Multicast Tree Generation in Networks with Asymmetric Links;" IEEE Transactions on Networking; vol. 4; Aug. 1996; pp. 1-12.
Rezaee, et al.; "Multi Packet Reception and Network Coding;" Presentation at the 2010 Military Communications Conference Unclassified Technical Program; Nov. 2, 2010; 15 pages.
Rezaee et al.; "Speeding Multicast by Acknowledgment Reduction Technique (SMART)," ArXiv:1104.2941v2 [cs.NI] Sep. 10, 2011; 6 pages.
Rezaee, etal.; "Multi Packet Reception and Network Coding;" Military Communications Conference; 2010; MILCOM 2010; IEEE; Oct. 31-Nov. 3, 2010; pp. 1393-1398.

(56) References Cited

OTHER PUBLICATIONS

Riemensberger, et al.; "Optimal Slotted Random Access in Coded Wireless Packet Networks;" WiOPt 10: Modeling and Optimization in Mobile, Ad Hoc and Wireless Networks; Jul. 13, 2010; pp. 374-379.
Roughgarden, et al.; "How Bad is Selfish Routing?" Journal of the ACM; vol. 49, No. 2; Mar. 2002; pp. 236-259.
Ruemmler, et al.; "An introduction to disk drive modeling;" IEEE Computers; vol. 27; No. 3; Mar. 17-29, 1994; 17 pages.
Ryabko, et al.; "On Hypotheses Testing for Ergodic Processes;" Information Theory Workshop; ITW'08; IEEE; 2008; pp. 281-283.
Sanders, et al.; "Polynomial Time Algorithms for Network Information Flow;" 15th ACM Symposium on Parallel Algorithms and Architectures; Jun. 2003; pp. 1-9.
Sayenko, et al.; "Performance Analysis of the IEEE 802.16 ARQ Mechanism;" MSWiM'07; Oct. 22-26, 2007; pp. 314-322.
Scharf; "MPTCP Application Interface Considerations draft-scharf-mptcp-ap-04;" Internet Engineering Task Force; Internet-Draft; Nov. 22, 2010; 26 pages.
Seferoglu, et al.; "Opportunistic Network Coding for Video Streaming over Wireless;" Packet Video; Nov. 2007; 10 pages.
Sengupta, et al.; "An Analysis of Wireless Network Coding for Unicast Sessions: The Case for Coding-Aware Routing;" in INFOCOM 2007; 26th IEEE International Conference on Computer Communications; Jun. 2007; 9 pages.
Servetto, et al.; "Constrained Random Walks on Random Graphs: Routing Algorithms for Large Scale Wireless Sensor Networks;" WSNA 02; Sep. 28, 2002; 10 pages.
Shenker, et al.; "Pricing in computer networks: reshaping the research agenda;" Telecommunications Policy; vol. 20, No. 3; Jan. 1996; pp. 183-201.
Sherali, et al.; "Recovery of primal solutions when using subgradient optimization methods to solve Lagrangian duals of linear programs;" Elsevier Operations Research Letters 19 (Jan. 1996); pp. 105-113.
Shields "The Interactions Between Ergodic Theory and Information Theory;" IEEE Transactions on Information Theory, vol. 44, No. 6; Oct. 1998; pp. 2079-2093.
Shrader, et al.; "Systematic wireless network coding," Military Conference, 2009; MILCOM 2009; IEEE; 7 pages.
Shrader, et al; "Routing and Rate Control for Coded Cooperation in a Satelite-Terrestrial Nework;" IEEE: The 2011 Military Communications Conference—Track 2—Network Protocols and Performance; Nov. 7-10, 2011; pp. 735-740.
Shriver, et al.; "An analytic behavior model for disk drive with readahead caches and request reordering;" Proc. SIGMETRICS/Performance, Joint Conf. on Meas. and Modeling Comp. Sys.; ACM; Jan. 1998; 10 pages.
Song, et al.; "Zero-Error Network Coding for Acyclic Networks;" IEEE Transactions on Information Theory; vol. 49, No. 12; Dec. 2003; pp. 3129-3139.
SongPu, et al.; "Performance analysis of joint chase combining and network coding in wireless broadcast retransmission;" Wireless Communication, Network and Mobile Computing 2008; WiCOM '08, 4th International Conference on Oct. 12-14, 2008; pp. 1-4.
Soo Suh; "Send-On-Delta Sensor Data Transmission With a Linear Predictor;" Sensors; ISSN 1424-8220; vol. 7; No. 4; Apr. 26, 2007; pp. 537-547.
Sun, et al.; "Cooperative Hybrid-ARQ Protocol with Network Coding;" Communications and Networking in China 2009—ChinaCOM 2009; Fourth International Conference on Aug. 26-28, 2009; pp. 1-5.
Sundaram, et al.; "Multirate Media Streaming Using Network Coding;" Proc. 43rd Allerton Conference on Communication, Control, and Computing; Sep. 2005; 7 pages.
Sundararajan, et al.; "ARQ for Network Coding;" IST Proc. of the IEEE International Symposium on Information Theory (ISIT); Jul. 6-11, 2008; pp. 1651-1655.
Sundararajan, et al.; "Network Coding Meets TCP: Theory and Implementation;" Proceedings of the IEEE; vol. 99, issue 3; Mar. 2011; pp. 490-512.
Sundararajan, et al.; "Network coding meets TCP;" InfoCOM 2009; IEEE, Apr. 19-25, 2009; pp. 280-288.
Sundararajan, et al.; On Queueing in Coded Networks—Queue Size Follows Degrees of Freedom; IEEE Information Theory Workshop on Information Theory for Wireless Networks (ITW); Jul. 1-6, 2007; 6 pages.
Teerapittayanon, et al.; "Network Coding as a WiMAX Link Reliability Mechanism;" Multiple Access Communicaton; Lectures Notes in Computer Science; vol. 7642; pp. 1-12; 2012.
Teerapittayanon, et al.; "Performance Enhancements in Next Generation Wireless Networks Using Network Coding: A Case Study in WiMAX;" Massachusetts Institute of Technology; Jun. 2012; 130 pages.
Thobaben; "Joint Network/Channel Coding for Multi-User Hybrid-ARQ;" Source and Channel Coding (SCC) 2008; 7th International ITG Conference on Jan. 14-16, 2008; 6 pages.
Tosun, et al.; "Efficient Muiti-Layer Coding and Encryption of MPEG Video Streams;" Proc. 2000 IEEE International Conference on Multimedia and Expo; vol. 1; 2000; pp. 119-122.
Tosun, et al.; "Lightweight Security Mechanisms for Wireless Video Transmission;" Proc. Intl. Conference on Information Technology, Coding and Computing; Apr. 2001; pp. 157-161.
Tran, et al.; "A Hybrid Network Coding Techniques for Single-Hop Wireless Networks;" IEEE Journal on Selected Areas in Communications; vol. 27; No. 5; Jun. 2009; pp. 685-698.
Tran, et al.; "A Joint Network-Channel Coding Technique for Single-Hop Wireless Networks;" Network Coding, Theory and Applications; 2008; NetCod 2008; Fourth Workshop on Jan. 3-4, 2008; pp. 1-6.
Trung, et al.; "Quality Enhancement tor Motion JPEG Using Temporal Redundancies;" IEE Transactions on Circuits and System for Video Technology, vol. 18; No. 5; May 2008; pp. 609-619.
Tsatsanis, et al.; "Network Assisted Diversity for Random Access Wireless Data Networks;" Signals, Systems & amp; Computers; IEEE; vol. 1; Nov. 1-4, 1988; pp. 83-87.
Valancius, et al., "Greening the Internet with Nano Data Centers;" Proc. 5th International Conference on Emerging Networking Experiments and Technologies; CoNEXT 2009; ACM 2009; Dec. 1-4, 2009; pp. 37-48.
Vasudevan, et al.; "Algebraic Gossip on Arbitrary Networks;" arXiv:0901.1444; Jan. 2000; 5 pages.
Velambi, et al.; "Throughput and Latency in Finite-Buffer Line Networks;" IEEE Transactions on Information Theory; vol. 57; No. 6; Jun. 2011; pp. 3622-3643.
Vien, et al.; "Network Coding-based Block ACK for Wireless Relay Networks;" Proceedings of IEEE Vehicular Technology Conference (VTC2011-Spring); May 2011; 5 pages.
Vien, et al.; "Network Coding-based ARQ Retransmission Strategies for Two-Way Wireless Relay Networks;" Software, Telecommunications and Computer Networks (SoftCOM) 2010; International Conference on Sep. 23-25, 2010; 5 pages.
Vilela, et al.; "Lightweight Security for Network Coding;" IEEE International Conference on Communications; May 2008: 5 pages.
Wang et al.; "Capacity-Delay Tradeoff for Information Dissemination Modalities in Wireless Networks;" in Information Theory; ISIT 2008; IEEE International Symposium; Jul. 2008; pp. 677-681.
Wang, et al.; "Embracing Interference in Ad Hoc Networks Using Joint Routing and Scheduling with Mulitple Packet Reception;" in INFOCOM 2008; The 27th Conference on Computer Communications; IEEE; Apr. 2008; pp. 1517-1525.
Wang, et al.; Multipath Live Streaming via TCP: Scheme, Performance and Benefits; ACM Transactions on Multimedia Computing, Communiciations and Applications; vol. 5; No. 3; Article 25; Aug. 2009; pp. 1-23.
Widmer, et al.; "Network Coding for Efficient Communication in Extreme Networks;" Applications, Technologies, Architectures, and Protocols for Computer Communication; Aug. 2005; pp. 284-291.
Wieselthier, et al.; "Energy Efficient Broadcast and Multicast Trees in Wireless Networks;" Mobile Networks and Applications 7; Jan. 2002; pp. 481-492.

(56) References Cited

OTHER PUBLICATIONS

Wieselthier et al.; "Energy-Aware Wireless Networking with Directional Antennas: The Case of Session-Based Broadcasting and Multicasting;" IEEE Transactions on Mobile Computing: vol. 1, No. 3; Jul.-Sep. 2002; pp. 176-191.

Wilhelm; "An Anomaly in Disk Scheduling: A Comparison of FCFS and SSTF Seek Scheduling Using an Empirical Model for Disk Access;" Communications of the ACM, vol. 19; No. 1; Jan. 1976; pp. 13-17.

Wu, et al.; "A Trellis Connectivity Analysis of Random Linear Network Coding with Buffering;" Proc. of the International Symposium on Information Theory (ISIT); Jul. 9-14, 2006; pp. 768-772.

Yazdi, et al.; "Optimum Network Coding for Delay Sensitive Applications in WiMAX Unicast;" IEEE INFOCOM 2009; Apr. 19-25, 2009; pp. 1576-2580.

Yeung; "Multilevel Diversity Coding with Distortion;" IEEE Transactions on Information Theory; vol. 41, No. 2; Mar. 1995; pp. 412-422.

Yong, et al.; "XOR Retransmission in Multicast Error Recovery;" Networks 2000; ICON; Proceedings IEEE International Conference on Sep. 5-8, 2000; pp. 336-340.

Yun, et al.; "High-Throughput Random Access Using Successive Interference Cancellation in a Tree Algorithm;" IEEE Transactions on Information Theory, vol. 53; No. 12; Dec. 2007; pp. 4628-4639.

Yun, et al.; Towards Zero Retransmission Overhead: A Symbol Level Network Coding Approach to Retransmission; IEEE Transactions on Mobile Computng; vol. 10; No. 8; Aug. 2011; pp. 1083-1095.

Zeger; "Packet Erasure Coding with Random Access to Reduce Losses of Delay Sensitive Multislot Messages;" IEEE; Paper ID #900482; Aug. 18, 2009; pp. 1-8.

Zhang, et al.; "Collision Resolution in Packet Radio Networks Using Rotational Invariance Techniques;" IEEE Transactions on Communication; vol. 50; No. 1; Jan. 2002; pp. 146-155.

Zhang, et al.; "Optimized Multipath Network Coding in Loss Wireless Networks;" ICDCS '08 Proceedings of the 2008 the $28^{th}$ International Conference on Distributing Computing Systems; Jan. 2008; 12 pages.

Zhang, et al.; Dual XOR in the AIR: A Network Coding Based Retransmission Scheme for Wireless Broadcasting; Communications (ICC) 2011 IEEE International Conference on Jun. 5-9, 2011; pp. 1-6.

Zhao, et al.; "A Multiqueue Service Room MAC Protocol for Wireless Networks With Multipacket Reception;" IEEE/ACM Transactions on Networking; vol. 11; No. 1; Feb. 2003; pp. 125-137.

Zhao, et al.; "On analyzing and improving COPE performance;" Information Theory and Applications Workshop (ITA), Jan. 2010; pp. 1-6.

Zhu, et al.; "Multicast with Network Coding in Application-Layer Overlay Networks;" IEEE Journal on Selected Areas in Communications; vol. 22; No. 1; Jan. 2004: pp. 1-13.

U.S. Appl. No. 14/882,115, filed Aug. 10, 2015, Lima, et al.
U.S. Appl. No. 14/843,358, filed Sep. 2, 2015, Haupler, et al.
U.S. Appl. No. 14/826,256, filed Aug. 14, 2015, Zeger, et al.

* cited by examiner

METHOD AND APPARATUS FOR REDUCING FEEDBACK AND ENHANCING MESSAGE DISSEMINATION EFFICIENCY IN A MULTICAST NETWORK

GOVERNMENT RIGHTS

This work was supported by the United States Department of the Air Force under Contract No. FA8721-05-C-0002. The Government has certain rights in this invention.

CROSS REFERENCE TO RELATED APPLICATION

Not applicable.

FIELD OF THE INVENTION

The subject matter disclosed herein relates generally to the transmission of information and, more particularly, to techniques for reducing feedback and improving message dissemination speed in an information transfer network.

BACKGROUND

In modern data networks there are many applications, such as bulk data transfer, that require reliable multicast. Reliability in multicast networks may be provided using, for example, Forward Error Correction (FEC), Automatic Repeat Requests (ARQ), and/or other feedback mechanisms. Traditional multicast protocols, whose operations depend on feedback, face a growing challenge as the number of recipient nodes increases and the inadvertent feedback traffic becomes unmanageable. This feedback traffic represents communication overhead that consumes valuable channel resources in a network. The feedback traffic can also generate delays in a network that can significantly increase the amount of time it takes to complete a multicast operation. It is generally desirable that overhead be reduced as much as possible in a communication network to, for example, free up channel resources and improve information flow. It is also generally desirable that data transfer operations be performed in a rapid and efficient manner.

SUMMARY

Techniques and systems described herein are capable of providing highly reliable multicast transmission with reduced feedback and enhanced message dissemination speeds. A feedback mechanism is provided for multicast networks that uses a predictive model to choose an optimal (or near optimal) feedback time during a multicast operation. This allows for a significant reduction of unnecessary feedback, thereby resulting in shorter total transmission times. The predictive model may use an expected total transmission time to accurately estimate the time at which transmissions are likely to be able to be terminated.

In some embodiments, the selection of one or more time slots for use in the transmission of feedback may be based, at least in part, on a probability $\beta(t)$ that all desired data packet transfers associated with a multicast operation have successfully completed. This probability $\beta(t)$ may be calculated based on, for example, packet erasure probabilities $p_e$ in the network. The techniques may be used in networks where packet erasure probabilities are substantially the same for all recipient nodes associated with a multicast operation and also in networks where different recipient groups have different packet erasure probabilities.

In some implementations, where network coding is used, reductions in feedback traffic may be achieved by limiting feedback transmissions to only those nodes that need additional degrees-of-freedom to be able to decode previously received coded packets. In certain implementations, techniques are provided for allowing multiple destination nodes in a network to transmit feedback to a source node in a relatively compact form (e.g., within a single time slot). In part, this reduction in feedback may be accomplished by intelligently selecting the timing of the feedback transmissions, as described above. The feedback transmitted by these nodes may be indicative of the number of degrees-of freedom needed by the nodes. Various techniques are described for managing the feedback.

In at least one embodiment, the feedback techniques described herein are employed in networks that use linear network coding to facilitate the distribution of multicast messages in the network. In other implementations, fountain codes, systematic codes, and/or other types of structured codes may be used.

Techniques described herein are also capable of providing highly reliable multicast delivery when an actual number of recipients is unknown. In some scenarios, one or more nodes within a network may have little or no transmit capability. This may occur, for example, when a node is a receive-only node, when a node has a simplified transmitter architecture (e.g., in RFID applications), when a node has low power capability, when a node is configured for use in stealth applications, when a node's ability to transmit is limited due to spectrum restrictions (e.g., aircraft applications, etc.), and/or in other circumstances. In these scenarios, the described techniques are still capable of providing enhanced message dissemination speeds with limited feedback.

The techniques and concepts described herein have many advantages over previous multicast feedback schemes. For example, unnecessary initial polling by a transmitter may be eliminated in some cases by use of a predictive model. Also, a significant reduction in a number of time slots allocated for feedback may be achieved in some implementations. In addition, unnecessary retransmissions to receivers can, in many cases, be greatly reduced. Further, the techniques are, in many instances, robust and scalable, even if there are an uncertain number of destination nodes. The disclosed techniques may be useful in many different applications. In one application, for example, the techniques may be implemented in large latency and delay challenged networks, where feedback about received packets may be considerably delayed (e.g., satellite based networks, etc.). As can be appreciated, such delay will often reduce the usefulness and accuracy of feedback in a network. Some other applications include reliable bulk data transfers, streaming video, data transfers to a large set of receivers, and many others. The disclosed techniques may be beneficially implemented in cases where less than all nodes that require additional degrees of freedom transmit feedback. In addition, the techniques may be successfully implemented even if the source node does not know the exact number of nodes transmitting feedback.

DETAILED DESCRIPTION

Figure 1:
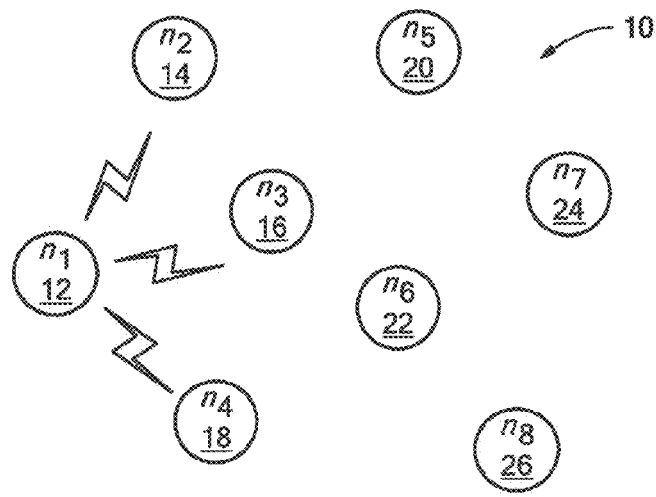
FIG. 1 is a schematic diagram illustrating an example wireless network arrangement that may implement features described in the present disclosure.

FIG. 1 is a schematic diagram illustrating an example wireless network arrangement 10 that may implement features described in the present disclosure. As illustrated, network arrangement 10 may include a number of wireless nodes 12, 14, 16, 18, 20, 22, 24, 26 that each have wireless communication functionality to support wireless communication with one or more other nodes. In one possible scenario, network arrangement 10 may be set up as an infrastructure-type network where one of the nodes (e.g., node 12) acts as, for example, a base station, wireless access point, or satellite through which user nodes (e.g., nodes 14, 16, 18, 20, 22, 24, and 26) communicate. The base station node may also provide a connection to other base stations and/or one or more other network or systems (e.g., a private enterprise network, the Internet, a public switched telephone network (PSTN), a local area network, a municipal area network (MAN), a wide area network, and/or others).

In another possible scenario, network arrangement 10 of FIG. 1 may be set up as a wireless mesh or ad-hoc network in which the nodes 12, 14, 16, 18, 20, 22, 24, 26 of the network are able to communicate with one another through peer-to-peer wireless links and do not need to communicate through a centralized node like a base station or access point. Mesh networks may, in some eases, include one or more mesh gateways to provide communication between mesh nodes and other networks (e.g., other mesh networks, the Internet, a private enterprise network, the Internet, a public switched telephone network (PSTN), a local area network, a municipal area network (MAN), a wide area network, and/or others). In some mesh networks, known as fully connected networks, each of the nodes in the network is connected to each of the other nodes through a direct wireless link. In other mesh networks, relay nodes may be used to transfer data between certain node pairs when a direct link is not available. These networks may be referred to as multi-hop networks.

Features described in the present disclosure have application in many different types of networks including wireless infrastructure-type networks, wireless mesh or ad-hoc networks (including both fully connected and multi-bop networks), hybrid networks that include features of both infrastructure and ad-hoc networks, and/or other types of networks. It should be appreciated that network arrangement 10 of FIG. 1 is merely an example of one type of network environment in which features of the present disclosure may be practiced in some implementations. The techniques and concepts described herein may be used in networks having any number of nodes and any number of different network topologies, including hybrid topologies. In some implementations, networks having hundreds or even thousands of different nodes may utilize features of the present disclosure. Techniques described herein also have application in wired networks (e.g., asymmetric digital subscriber line (ADSL) networks, power line distribution systems, etc.).

In some operational scenarios, one of the nodes of a network may desire to transmit data to multiple other nodes in the network. If this is done as a single transaction, the operation may be referred to as a multicast operation (e.g., with reference to FIG. 1, a transmission from node 12 to nodes 14, 16, 22, and 26). If a multicast operation involves all of the nodes of the network, it may be referred to as a broadcast operation (e.g., with reference to FIG. 1, a transmission from node 12 to nodes 14, 16, 18, 20, 22, 24, and 26). In a multicast transmission, the transmitting node may be referred to as a source node and each receiving node may be referred to as a destination node. During a multicast transmission, a source node may want to know whether the transmitted information vias successfully received by the destination nodes. To gain this knowledge, feedback from the destination nodes may be used. In some networks, acknowledgement messages or ACKs may be sent automatically by destination nodes upon successful reception of a packet or in response to a request from the source node. In some systems, negative acknowledgement messages or NACKs may be used to indicate to a transmitting node that a message was not received by a destination node or was received in a corrupted or incomplete form that prevented accurate decoding.

ACK and/or NACK messages represent a form of communication "overhead" in a network. That is, these messages consume network bandwidth to perform a function other than the direct transfer of useable information. The use of ACK and/or NACK messages may also create undesirable delays in a network. As will be appreciated, as the number of nodes in a network increases, the number of ACK and/or MACK messages being transmitted in the network may rise to unmanageable levels. This situation may be referred to as an "ACK explosion." In general, it is desirable to reduce the amount of overhead in a network, especially if this can be done with little or no impact on communication reliability. It is also generally desirable to increase the speed at which multicast operations are performed. Techniques are described herein that are capable of significantly reducing feedback traffic and increasing message dissemination speeds in certain network scenarios.

One way to model a wireless channel is as an "erasure channel" having a packet erasure probability $p_i$. In an erasure channel, a transmitted packet is either successfully received by a destination node or "erased." The erasure probability $p_i$ is the probability that the message will be erased. As will be described in greater detail, in some implementations described herein, packet erasure probabilities may be used to determine an appropriate timing for feedback in a network.

Network coding is a technique that may be used in a wireless or wired network to improve information flow in the network. Random linear network coding (RLNC) is a form of network coding that uses randomly generated coefficients to form linear combinations of packets to be transmitted in a network. RLNC has been shown to be a powerful technique for achieving robust, high throughput multicast and broadcast packet distribution in certain network environments. One example system and method for implementing RLNC is described in U.S. Pat. No. 7,706,365 to Effros et al. entitled "Randomized Distributed Network Coding," which is hereby incorporated by reference in its entirety. As will be described in greater detail, in some implementations, the techniques and features described in the present disclosure may be implemented in networks or systems using RLNC and/or other forms of network coding. The techniques and features also have application in networks and systems using other coding techniques (e.g., networks using fountain codes, systematic codes, structured codes, etc.).

In a network that uses RLNC, a source node that has a number of data packets to transmit may combine the packets together into a "coded packet" that is then transmitted into the network. A destination node in the network that receives the coded packet may then store the packet for eventual decoding. The destination node may require a particular number of coded packets before it is able to decode the coded packets to extract the original data packets. The decoding process may involve, for example, the solution of a system of linear equations having a number of independent variables the data packets) and a number of independent equations. Before a destination node can reliably solve for the original data packets, the number of "degrees of freedom" (or DOFs) received must equal or exceed the number of original packets. The DOFs missing may in some eases be defined as the number of unknown independent variables of a system of equations less the number of independent equations. In some implementations, each coded packet successfully received at a destination node may provide another equation for use in decoding and thus reduce the number of DOFs needed by the node by one. The source node may transmit a stream of coded packets until the destination nodes are able to decode the original data packets.

Figure 2:
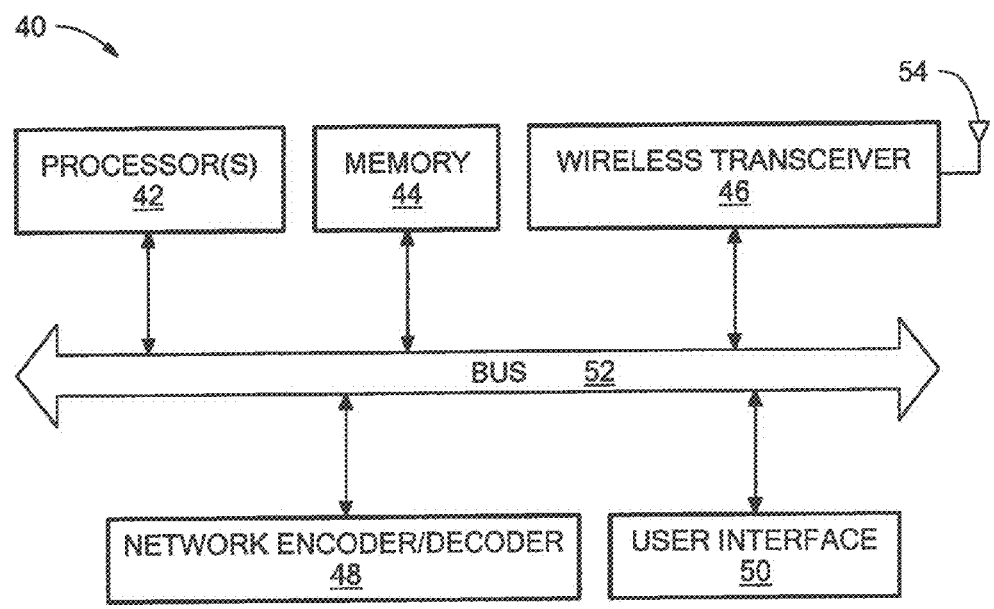
FIG. 2 is a block diagram illustrating an example node device architecture that may be used in a node device that incorporates features described in the present disclosure in an implementation.

FIG. 2 is a block diagram illustrating an example node device architecture 40 that may be used in a node device that incorporates features described in the present disclosure in one or more implementations. As illustrated, the node device architecture 40 may include: one or more digital processors 42, a memory 44, a wireless transceiver 46, a network encoder/decoder 48, and a user interface 50. A bus 52 and/or other structure(s) may be provided for establishing interconnections between various components of device architecture 40. Digital processor(s) 42 may include one or more digital processing devices that are capable of executing programs or procedures to provide functions and/or services for a user. Memory 44 may include one or more digital data storage system, devices, and/or components that may be used to store data and/or programs for other elements of node device architecture 40. User interface 50 may include any type of device, component, or subsystem for providing an interface between a user and a corresponding node device. Wireless transceiver 46 may include any type of transceiver that is capable of supporting wireless communication with one or more remote wireless entities.

Digital processor(s) 42 may include, for example, one or more general purpose microprocessors, digital signals processors (DSPs), controllers, microcontrollers, application specific integrated circuits (ASICs), field programmable gate arrays (FPGAs), programmable logic arrays (PLAs), programmable logic devices (PLDs), reduced instruction set computers (RISCs), and/or other processing devices or systems, including combinations of the above. Digital processor(s) 42 may be used to, for example, execute an operating system for a corresponding node device. Digital processor(s) 42 may also be used to, for example, execute one or more application programs for a node device. In addition, digital processor(s) 42 may be used to implement, either partially or fully, one or more of the communications related processes or techniques described herein in some implementations.

As described above, wireless transceiver 46 may include any type of transceiver that is capable of supporting wireless communication with one or more remote wireless entities. In various implementations, wireless transceiver 46 may be configured in accordance with one or more wireless networking standards and/or wireless cellular standards. In some implementations, multiple wireless transceivers may be provided to support operation in different networks or systems in a surrounding environment or with different wireless networking and/or cellular standards. Wireless transceiver 46 may, in some implementations, be capable of communicating with peer devices in a peer-to-peer, ad-hoc or wireless mesh network arrangement. In addition, in some implementations, wireless transceiver 46 may be capable of communicating with a base station or access point of an infrastructure-type wireless communication system or network. As illustrated in FIG. 2, wireless transceiver 46 may be coupled to one or more antennas 54 and/or other transducers, to facilitate the transmission and/or reception of communication signals. In some implementations, wireless transceiver 46 may be used to implement, either partially or fully, one or more of the communications related processes or techniques described herein. It should be appreciated that the techniques described in the present disclosure may, in some implementations, be implemented in wired communications networks or other networks or systems that do not use wireless communication. In some of these implementations, wireless transceiver 46 may be replaced with or supplemented by, for example, a wired communication device, component, card, or other structure.

Memory 44 may include any type of system, device, or component, or combination thereof, that is capable of storing digital information (e.g., digital, data, computer executable instructions and/or programs, etc.) for access by a processing device or other component. This may include, for example, semiconductor memories, magnetic data storage devices, disc based storage devices, optical storage devices, read only memories (ROMs), random access memories (RAMs), non-volatile memories, flash memories, USB drives, compact disc read only memories (CD-ROMs), DVDs, Blu-Ray disks, magneto-optical disks, erasable programmable ROMs (EPROMs), electrically erasable programmable ROM's (EE-PROMs), magnetic or Optical cards, and/or other digital storage suitable for storing electronic instructions and/or data.

Network encoder/decoder 48 may include a device or system fir performing network encoding and/or decoding for a node device. In a source node device that will generate and transmit network coded packets, network encoder/decoder 48 may include network encoding functionality. Likewise, in a receiving device that will receive and decode network encoded packets, network encoder/decoder 48 may include decoding functionality. In a node that may serve as both a source node and a destination node, both network encoding and decoding functionality may be provided. It should be appreciated that, although illustrated as a separate unit, network encoder/decoder 48 may be implemented, at least partially, within another component or device of a node in some implementations (e.g., within processor(s) 42 of FIG. 2, etc).

It should be appreciated that the node device architecture 40 of FIG. 2 represents one possible example of an architecture that may be used in an implementation. Other architectures may alternatively be used. As used herein, the term "node device" or "node" is used to describe any type of digital electronic device that includes some form of communication capability (wireless and/or wired). This may include, for example, a laptop, desktop, notebook, or tablet computer; a personal digital assistant (PDA); a personal communication service (PCS) device; a personal navigation assistant (PNA); a cellular telephone, smart phone, or other wireless communication device; a pager; a wireless sensor device; a satellite communication device; a media player having communication capability; a digital storage device with communication capability, and/or other devices. It should be appreciated that all or part of the various devices, processes, or methods described herein may be implemented using any combination of hardware, firmware, and/or software.

In various implementations, the techniques and systems described herein are capable of reducing the amount of feedback and/or data traffic in a communication network, and decreasing the time for completing file deliveries. In some implementations, feedback associated with a multicast operation may be reduced to as little as one time slot per cycle. In some embodiments, the selection of time slots for use in the transmission of feedback may be based, at least in part, on a probability $\beta(t)$ that all desired packet transfers in the network have successfully completed. The probability $\beta(t)$ may be calculated based on, for example, packet erasure probabilities $p_e$ in the network. The selection of time slots may also be based on, for example, file size k and/or an exact or estimated number n of receiving nodes. Other techniques for selecting feedback time slots may be used in other embodiments (including some techniques that do not calculate probability $\beta(t)$ and do not rely on knowledge of the number of nodes n in the network or on packet erasure probabilities).

In certain implementations, techniques are provided for allowing multiple destination nodes in a network to transmit feedback to a source node in a relatively compact form. As described above, in some implementations, this feedback may be transmitted in as little as a single time slot. In part, this reduction in feedback may be accomplished by intelligently selecting the timing of the feedback, as described above. In addition, in implementations where network coding is used, further reductions in feedback traffic may be achieved by limiting feedback transmissions to only those nodes that require additional degrees-of-freedom to be able to decode previously received coded packets. Various techniques are provided herein that may be used to carry out this feedback. In the discussion that follows, it will be assumed for simplicity that the described techniques are being used in a network. Where a base station is transmitting data to a number of user nodes. It should be understood, however, that these techniques may also be used in other network arrangements (e.g., ad-hoc networks, peer-to-peer communications, satellite broadcasting, etc.).

Figure 3:
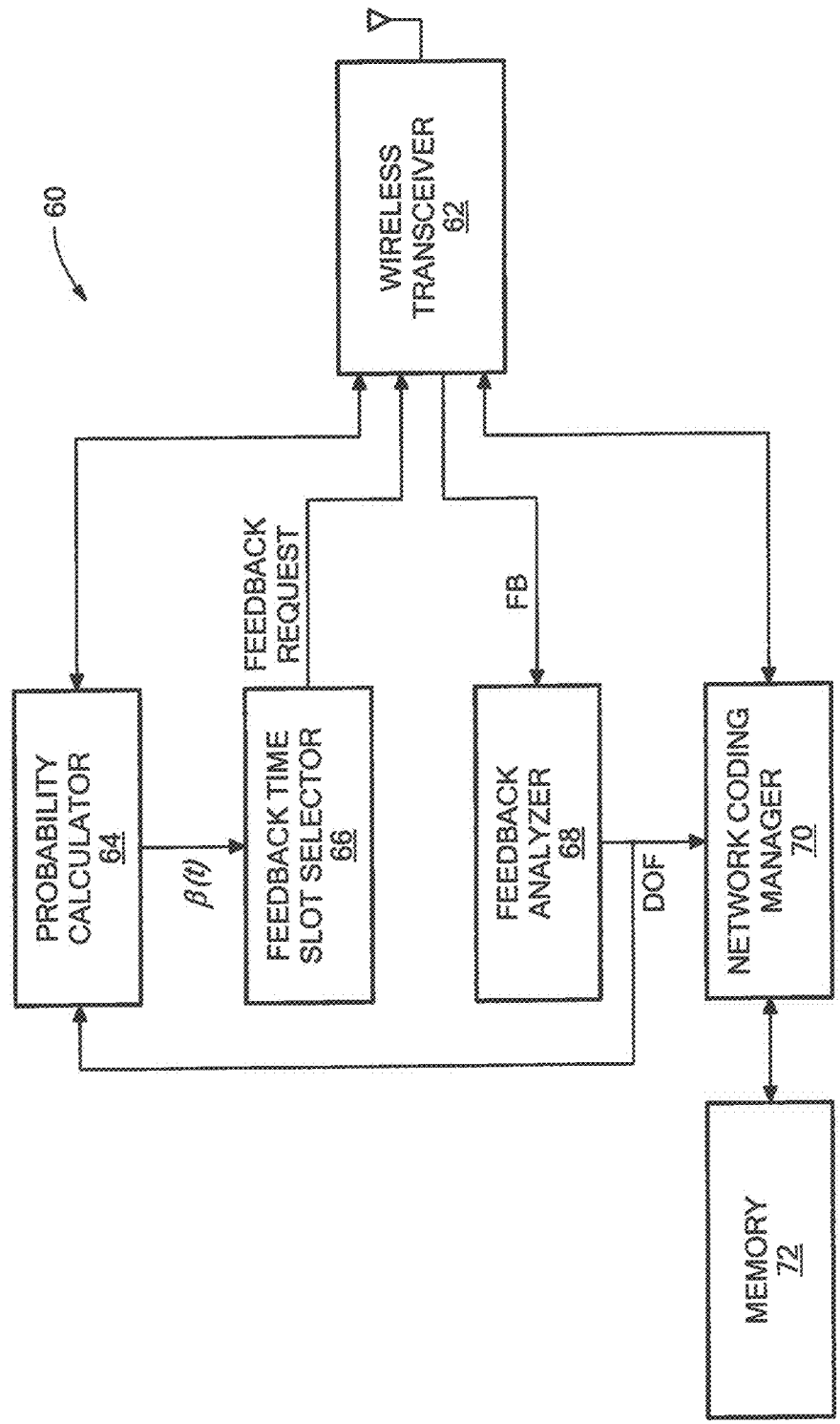
FIG. 3 is a block diagram illustrating an example processing arrangement that may be used within a source node in accordance with an implementation.

FIG. 3 is a block diagram illustrating an example processing arrangement 60 within a node device in accordance with an implementation. As illustrated, the processing arrangement 60 may include: a wireless transceiver 62, a probability calculator 64, a feedback time slot selector 66, a feedback analyzer 68, a network coding manager 70, and a memory 72.

A node device that includes processing arrangement 60 may utilize node device architecture 40 of FIG. 2 or some other architecture. Processing arrangement 60 may be used within, for example, a source node that seeks to transmit a plurality of packets to some or all of the other nodes in a network (e.g., a source node within network arrangement 10 of FIG. 1). A source node may, for example, have a file that is made up of k packets that needs to be transmitted to each of n independent user nodes. The packets may be stored within memory 72 before transmission. Network coding manager 70 may be operative for managing network coding operations for the corresponding node device. When the node device has a plurality of packets ready for transmission, network coding manager 70 may linearly combine the packets (referred to hereinafter as the original packets) according a particular network code to generate a coded packet. Network coding manager 70 may then direct the coded packet to wireless transceiver 62 for transmission at an appropriate time (e.g., during a scheduled transmission time slot).

In at least one implementation, network coding manager 70 may use random linear network coding (RLNC) to encode packets for transmission. As described previously, using RLNC, data packets to be transmitted are linearly combined using randomly generated coefficients. In some implementations, the randomly generated coefficients may be appended to the transmit signal for use in decoding by a destination node. In some other implementations, a sender and a receiver may have synchronized or, more generally, coordinated random number generators to generate the coefficients so that the coefficients do not need to be appended to the transmit signal. In one scenario, for example, a source node may desire to transmit a mother of packets $\vec{m}_1, \ldots, \vec{m}_k$, where each packet may comprise an l-dimensional vector over a finite field $F_q$. The packets $\vec{m}_1, \ldots, \vec{m}_k$ may all correspond to, for example, a single file that needs to be distributed to destination nodes. The transmitted signal may have the format $(\vec{\mu}, \vec{m})$, where $\vec{m} = \Sigma_{i=1}^{k} \mu_i \vec{m}_i$ is a linear combination of packets $\vec{m}_1, \ldots, \vec{m}_k$ and $\vec{\mu} = (\mu_1, \ldots, \mu_k) \in F_q^k$ is a vector of the coefficients used to generate the linear combination. As described previously, each destination node may store received coded packets for eventual decoding. When enough coded packets have been successfully received (i.e., the are zero degrees of freedom outstanding), the destination node may process the coded packets to recover the original packets. In some implementations, a source node may continue to transmit coded packets until all intended destination nodes have successfully recovered (i.e., decoded) all of the original data packets. Other forms of coding may be used in other implementations including, for example, other forms of network coding, fountain coding, systematic coding, and/or others.

Probability calculator 64 is operative for calculating a probability $\beta(t)$ that transmission can cease for a current transmit operation after t time slots. Transmission can cease when all of the intended destination nodes in the network have successfully recovered all of the original packets. As will be described in greater detail, the probability $\beta(t)$ may be calculated based, at least in part, on packet erasure probabilities in the network. Feedback time slot selector 66 is operative for selecting one or more future feedback time slots for destination nodes to use to transmit feedback to the source node. In at least one embodiment, feedback time slot selector 66 may make this determination based, at least in part, on probability $\beta(t)$. Feedback analyzer 68 is operative for analyzing feedback received from destination nodes during the feedback time slot(s). As will be described in greater detail, in some implementations, feedback analyzer 68 may determine a number of DOFs required by a worst case destination node in the network based on the feedback. Feedback analyzer 68 may deliver this number of DOFs to the network coding manager 70 so that appropriate additional coded packets may be transmitted. In some implementations, feedback analyzer 68 may also deliver the number of DOFs to probability calculator 64 for use in calculating probabilities.

As described above, probability calculator 64 is operative for calculating a probability β(t) that transmission can cease for a current transmit operation after t time slots. To calculate β(t), probability calculator 64 may use a packet erasure probability of the network. In some embodiments, probability calculator 64 may assume that all channels in the network are statistically identical and have the same packet erasure probability $p_e$. In other embodiments, probability calculator 64 may assume that each channel has its own distinct erasure probability or that different groups of channels have different erasure probabilities. Probability calculator 64 may, in some implementations, estimate the packet erasure probability or probabilities. In one possible approach, probability calculator 64 may assume a slotted broadcast erasure channel where each transmitted packet is received independently with probability $1-p_e$ at any of n destination nodes. In other embodiments, the probability of reception at one node can depend on that at other nodes. The case of correlated channels corresponds to effectively decreasing the number n of users. In general, a transmission will be considered completed when each of n receivers has successfully received k or more coded packets. The number of degrees-of-freedom that are missing at a node i after t time slots may be denoted $M_i^t \in [0, k]$. The number of degrees of freedom missing at the node that has experienced the highest number of erasures during t transmissions (the worst case node) may be denoted as random variable $M_t = \max\{M_1^t, M_2^t, \ldots, M_n^t\}$. In some implementations, the probability that a destination node has received k or more coded packets in r time slots may be expressed as:

$$Pr\{M_i^t = 0\} = 1 - \sum_{j=0}^{k-1} \binom{t}{j} p_e^{t-j} (i - p_e)^j$$

The probability β(t) that all n receivers have completed the download after t time slots may then, for the case of independent channels to different receivers, be expressed as:

$$\beta(t) = Pr\{M_t = 0\} = (Pr\{M_i^t = 0\})^n = \left(1 - \sum_{j=0}^{k-1} \binom{t}{j} p_e^{t-j} (i - p_e)^j\right)^n.$$

In other implementations, different techniques for calculating probability β(t) may be used.

Feedback time slot selector 66 may select one or more time slots for transmission of feedback from destination nodes based on the probability β(t) generated by probability calculator 64. After one or more feedback time slots have been selected, feedback time slot selector 66 may cause a feedback request to be transmitted to the destination nodes associated with a particular transmit operation to request destination nodes that still require one or more degrees-of-freedom to transmit the number of DOFs needed to the source node during the feedback time slot(s). In some implementations, feedback time slot selector 66 will only select a single feedback time slot initially. As will be described in greater detail, various transmission techniques may be used that permit multiple nodes to transmit DOF information to the source node during a single time slot. To reduce the amount of feedback traffic in the network, feedback time slot selector 66 may only request feedback when β(t) is sufficiently large (e.g., at or above a predetermined threshold value). In such cases, the source node may be able to cease transmissions β(t) proportion of the time.

Once feedback time slot selector 66 has scheduled initial feedback at time t, it may next attempt to estimate the number of nodes that may request feedback in the time slot. To do this, feedback time slot selector 66 may calculate the expected value of the minimum of n random variables. $N_1$ may be used to denote the number of nodes that have not completed the data transfer at time t and $\overline{N_1}$ may be used to denote the expected value of $N_1$. The probability mass function (pmf) of $N_1$, may be expressed as follows:

$$Pr\{N_i = i\} = \binom{n}{i}(Pr\{1 \text{ node completed download by } t\})^{n-i} \cdot (1 - Pr\{1 \text{ node completed download by } t\})^i$$

Figure 9:
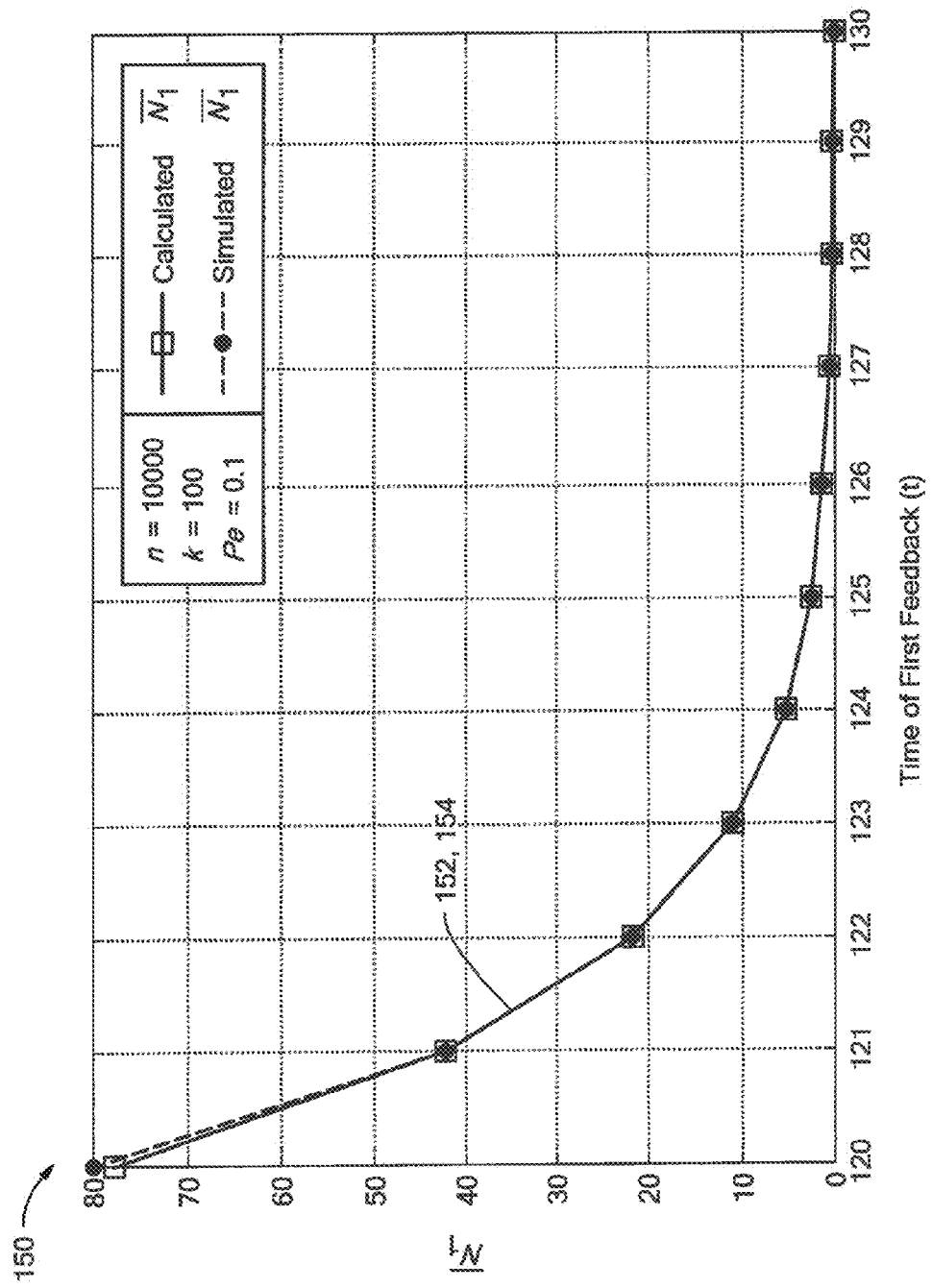
FIG. 9 is a plot illustrating an expected value of the number of nodes that have not completed a data transfer at time t ($\overline{N_1}$) as a function of initial feedback time in accordance with an implementation.

The expected value may be expressed as:

$$\overline{N_1} = \int_0^\infty (1 - F(x)) dx$$

Where F is the cumulative distribution function of $N_1$. FIG. 9 is a plot 150 showing an expected value of the number of nodes $N_1$ that have not completed a data transfer at time t for an arrangement having n=10,000 nodes, k=100 packets, and $p_e$=0.1. Plot 150 includes a first curve 152 depicting analytical results calculated using the above equation and a second curve 154 depicting simulated values. It should be noted that the analytical results and the simulated values are almost identical. As illustrated, the expected value of $N_1$ decreases rapidly as the initial feedback time increases.

In at least one implementation, feedback time slot selector 66 may calculate an expected number of transmissions that are required to send a file of k packets to n receivers over a broadcast erasure channel with packet erasure probability $q_0$. Using $\overline{T_1}$ to denote this expected value, feedback time slot selector 66 may schedule the initial feedback after $\overline{T_1}$ transmissions (or, in some implementations, slightly before $\overline{T_1}$ transmissions). The expected value of $T_1$ may be calculated as $$\overline{T_1} = k + \sum_{t=k}^{\infty} (1 - \beta_{min}^X(t, n, k, Q))$$

where $\beta_{min}^x$ is the probability that k or more coded packets have been received by all n receivers after t time slots and Q is the Bernoulli distribution Q=(q1, q0) and qi=Pr{=x=i}. Numerical results show that the above infinite sum may be accurately computed by summing at least the first $2k/(1-q0)$ terms.

During the initial feedback slot, the source node may determine the number of coded packets $K_1$ missing at the worst case receiver node. The source node may then calculate the expected number of receiver nodes $N_1$ that have not completed the download by $\overline{T_1}$ and may assume that, for example, every one of these nodes is in need of $K_1$ packets. Nodes that have not completed the download have received fewer than k degrees-of freedom after $\overline{T_1}$ transmissions. The expected number of receiver nodes $N_1$ may, in some embodiments, be calculated as follows:

$$\overline{N_1} = E[N \mid (\overline{T_1}, n, k, Q)]$$
$$= n(1 - \beta_{min}^X(\overline{T_1}, 1, k, Q))$$

This number $\overline{N_1}$ may be useful for allocating multiple feedback slots in implementations that do not allow only a single feedback slot. The number of transmissions $T_2$ in the second round may be calculated in the same manner as $\overline{T_1}$, but with a new set of parameters $(\overline{N_1}, k_1, Q)$ instead of $(n, k, Q)$. Thus:

$$\overline{T_2} = k_1 + \sum_{t=k_1}^{\infty} (1 - \beta_{min}^X(t, \overline{N_1}, k_1, Q))$$

More generally, the number of transmissions in the $j^{th}$ round can be obtained from:

$$\overline{T_j} = k_{j-1} + \sum_{t=k_{j-1}}^{\infty} (1 - \beta_{min}^X(t, \overline{N_{j-1}}, k_{j-1}, Q))$$

Retelling back to FIG. 3, feedback analyzer 68 may listen for and analyze feedback signals received during the feedback time slot(s). As described previously, in some implementations, only destination nodes that require one or more additional DOFs to extract the originally transmitted data will transmit feedback during this period. In addition, the feedback signal for each node may include an indication of the number of DOFs needed. Feedback analyzer 68 may analyze the feedback to determine the number of DOFs required by a worst case destination node. Once this number of DOFs is known, network coding manager 70 may transmit additional coded packets. The number of additional coded packets that are transmitted may depend on, for example, the number of DOFs required by the worst case destination node (e.g., in at least one implementation, the number of additional packets may be estimated by $$\hat{M}_t = \frac{M_t}{1 - p_e}).$$

Feedback time slots selector 66 may schedule another feedback time slot (or several additional slots) for a time after the additional packets have been transmitted. If any feedback responses are received during this new feedback time slot(s), the above described process may be repeated. If no additional feedback is received, the transmit operation of the original k packets may be considered to have been successfully completed.

Figure 4:
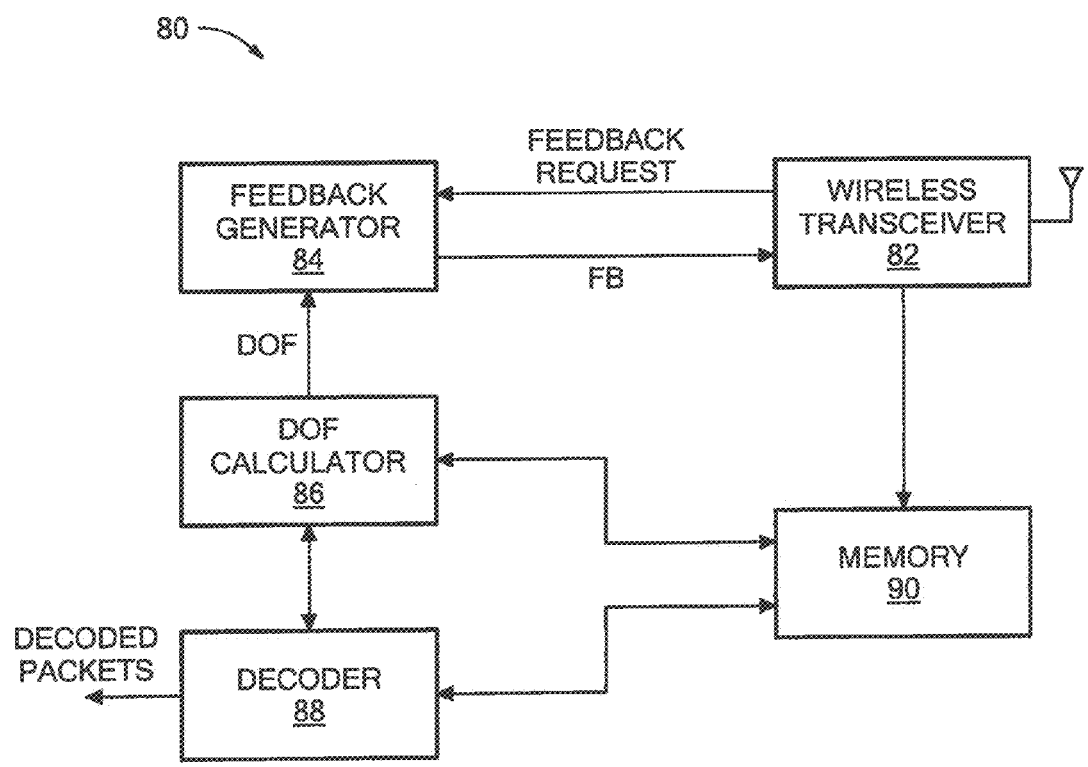
FIG. 4 is a block diagram illustrating an example processing arrangement that may be used within a destination node in accordance with an implementation.

FIG. 4 is a block diagram illustrating an example processing arrangement 80 within a node device in accordance with an implementation. As illustrated, processing arrangement 80 may include: a wireless transceiver 82, a feedback generator 84, a DOF calculator 86, a decoder 88, and a memory 90. The node device having processing arrangement 80 may utilize node device architecture 40 of FIG. 2 or some other architecture. The node device may be used as a destination node that seeks to decode coded packets received from a remote source node (within, for example, wireless network arrangement 10 of FIG. 1). Wireless transceiver 82 may receive coded packets from a wireless channel and store the packets in memory 90 for eventual decoding. DOF calculator 86 may keep track of the number of DOFs that the node device needs to be able to decode the received coded packets. When a sufficient number of coded packets have been received, decoder 88 may retrieve the coded packets from memory 90 and process them to extract the original data. In a network, it is common to have some nodes that can act as both source nodes and destination nodes. Therefore, in some implementations, a single node may include functionality from both FIG. 3 and FIG. 4.

As described previously, in some implementations, a source node in a network may request feedback from destination nodes. As part of the request, the source node may specify a particular feedback time slot to be used. Feedback generator 84 may receive a feedback request and, if needed, generate feedback during the feedback time slot for delivery to the source node. Feedback generator 84 may, in some implementations, receive an indication from DOF calculator 86 of the number of DOFs that are currently needed to recover the originally transmitted data packets. If one or more DOFs are needed, feedback generator 84 may generate feedback during the feedback time slot that is indicative of the number of DOFs. If no DOFs are needed, feedback generator 84 may, in some implementations, send nothing during the feedback time slot.

Figure 5:
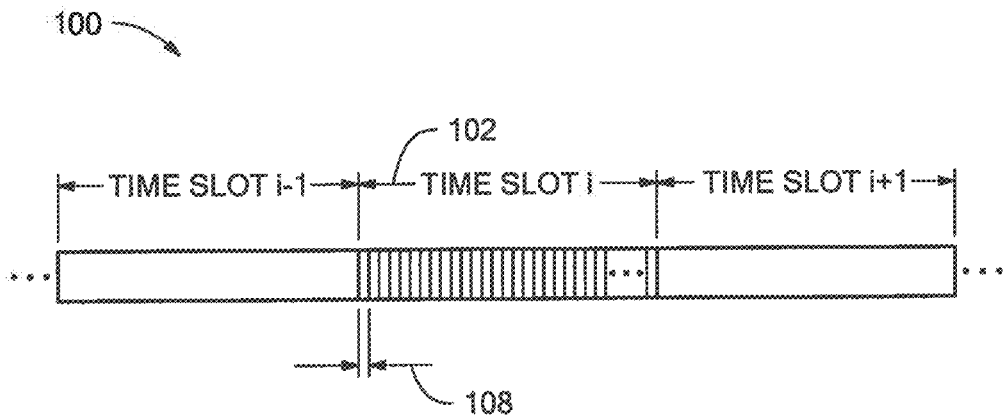
FIGS. 5 and 6 are timing diagrams illustrating two possible single slot feedback techniques accordance with implementations.
Figure 6:
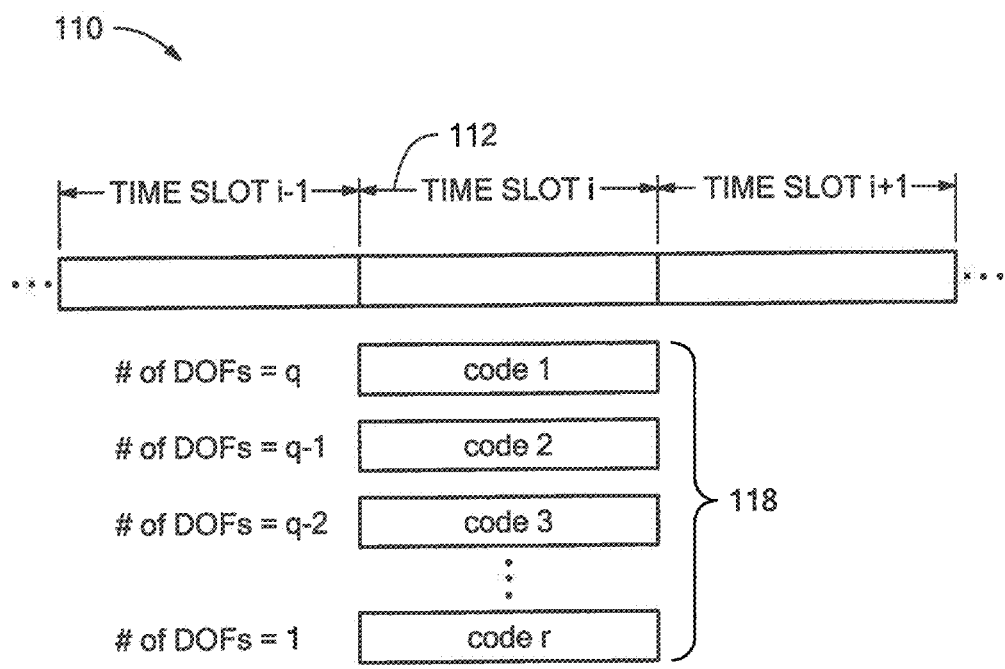

As will be appreciated, in some situations, there may be more than one destination node that needs one or more DOFs. Therefore, multiple nodes may need to transmit feedback during the feedback time slot. Any number of different techniques may be used to allow these multiple nodes to transmit within the same time slot. FIGS. 5 and 6 are timing diagrams illustrating two possible single slot feedback techniques in accordance with different implementations. Feedback generator 84 of FIG. 4 may use one of these techniques or an alternative technique to transmit feedback to a source node. FIG. 5 illustrates a feedback technique that uses "jitter" within the feedback time slot and FIG. 6 illustrates a technique that uses direct sequence code division multiple access (DS-CDMA). Referring now to FIG. 5, a continuing series of time slots 100 may include a feedback time slot 102 that is divided into a number of time-based sub-slots 108. When a node requires at least one DOF to decode the k original packets, it may transmit a pulse within one of the sub-slots 108. The sub-slot that the node transmits within may be indicative of the number of DOFs (or the percentage of DOFs) that the node needs to decode the file, in one possible approach, for example, the higher the number of DOFs that a node needs, the earlier the sub-slot that the node transmits within during the feedback time slot 102. If this approach is used, a source node (e.g., feedback analyzer 68 of FIG. 3) only needs to look for the earliest pulse within the feedback time slot to determine the number of additional coded packets need to be transmitted.

Referring now to FIG. 6, a series of time slots 110 may include a feedback time slot 112 within which DS-CDMA is used. As shown, a number of codes 118 (or pseudo random sequences) may be provided that each correspond to a particular number or percent of required DOFs or a particular range of required DOFs. When a node needs one or more DOFs to decode the k packets, it may select a code corresponding to the number or percent of DOFs it needs, and use that code to generate a feedback signal for transmission during the feedback time slot. After receiving the feedback, the source node (e.g., feedback analyzer 68 of FIG. 3) may apply one or more matched filters to the feedback signal to decode the signals. In one possible approach, the source node may apply the matched filters in a particular order, starting with the filter corresponding to the highest number or percent of required. DOFs and moving one by one to the filter corresponding to the lowest number or percent of required DOFs. Once a signal is detected, the source node may know the largest number of DOFs needed by a destination node and may stop applying the matched filters. The source node may then transmit an appropriate number of coded packets based on the DOF number. In at least one implementation, the CDMA codes may be ordered so that pairs of codes that represent similar numbers or percents of missing DOFs would have higher correlations than pairs of codes that represent vastly differing numbers or percents of missing DOFs. This ordering may increase the robustness of the feedback technique to feedback erasures as well as to a noisy feedback channel, or one suffering from other forms of degradation.

Other techniques for implementing single slot feedback may also be used in various implementations. In one approach, for example, an energy detection mechanism may be used at the source node to enable the node to determine whether or not all users have successfully received the file. The source node may then use the predictive model discussed previously to select a feedback time distant enough so that the probability of any nodes needing more than one additional coded packet is small. This approach is particularly useful when not much bandwidth can be allocated to feedback.

Figure 7:
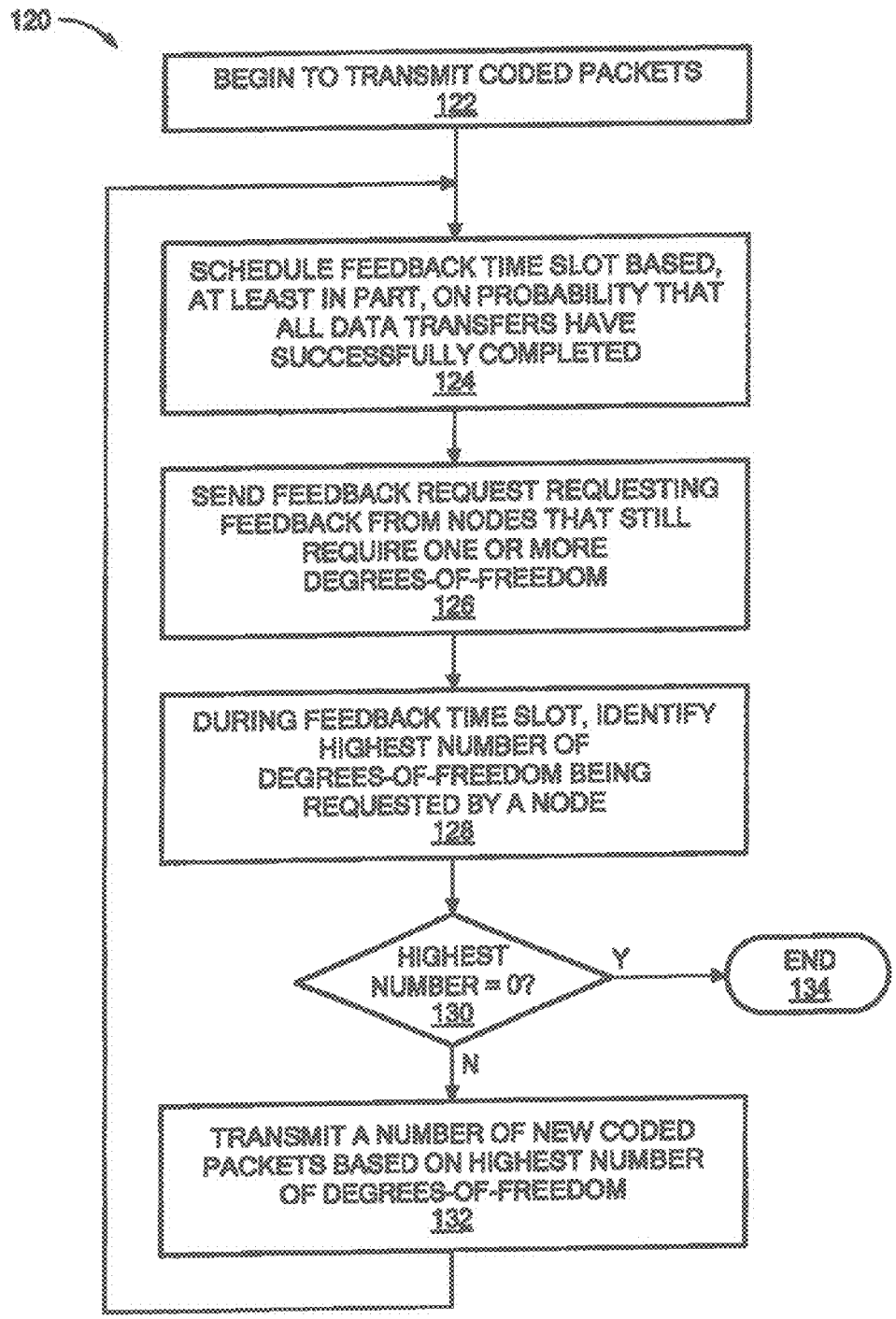
FIG. 7 is a flowchart illustrating an example method for managing feedback in a network that uses network coding in accordance with an implementation.

FIG. 7 is a flowchart illustrating a method 120 for managing feedback in a network that uses coding in accordance with an implementation. The coding may include, for example, random linear network coding, fountain coding, systematic coding, or some other type of structured coding. The method 120 may be implemented within, for example, a node acting as a source node in a network (e.g., node 12 of wireless network arrangement 10 of FIG. 1, etc.). A source node may have k packets that need to be distributed to a number of destination nodes. The source node may begin to transmit coded packets that include the k original packets (block 122). A feedback time slot may then be scheduled based, at least in part, on a probability that all data transfers have successfully completed at a time slot t (block 124). As described previously, in some implementations, a feedback time slot t may be selected that is expected to result in a relatively small number of destination nodes (or no destination nodes) that require further DOFs at the time of the feedback (i.e., a high probability that all data transfers have successfully completed at a time slot t). In at least one embodiment, a feedback time slot may be scheduled based, at least in part, on an expected total transmission time until each destination node has successfully received enough coded packets to extract the plurality of data packets. A feedback request may next be transmitted to the destination nodes, identifying the feedback time slot and requesting feedback from nodes that still require one or more DOFs to perform decoding (block 126). During or subsequent to the feedback time slot, the feedback may be analyzed to identify a highest number (or percent) of DOFs being requested by a node (block 128). If the highest number of DOFs is equal to zero (block 130-Y), then the method 120 may terminate (block 134). If the highest number of DOFs does not equal zero (block 130-N), then a number of new coded packets may be transmitted that is based, at least in part, on the highest number of DOFs (block 132). As described previously, in at least one implementation, $$\hat{M}_t = \frac{M_t}{1 - p_e}$$

additional coded packets may be transmitted, where $p_e$ is a packet erasure probability. More generally, the number of additional coded packets transmitted is a function of $M_t$. The method 120 may then return to block 124 to schedule a new feedback time slot. The method 120 may then continue until all destination nodes have recovered all original packets (block 134).

With reference to FIG. 7, in an alternative approach to transmission termination, the first time that the highest number of DOFs is determined to be zero in block 130, the source node may decide to send one or more additional rounds of feedback requests just to confirm that the feedback was not lost in the channel. A new feedback time slot will be selected (block 136) and a new feedback request will be transmitted. After one or two additional iterations that generate no feedback, there will be a greater likelihood that no feedback was transmitted.

In method 120 described above, a single time slot is scheduled for feedback in block 124. In other implementations, two or more time slots may be initially scheduled to carry feedback information. In single time slot implementations, a mechanism may be provided that will allow multiple destination nodes to transmit feedback during a single time slot. This mechanism may include, for example, the jitter technique of FIG. 5, the DS-CDMA technique of FIG. 6, or some other technique. In some implementations, some or all of the blocks of method 120 may be implemented within one or more digital processors of a node device (e.g., digital processor(s) 42 of FIG. 2, etc.). In at least one implementation, method 120 may be realized as a series of instructions stored on a computer readable medium that may be executed by one or more processors of a computing system.

Figure 8:
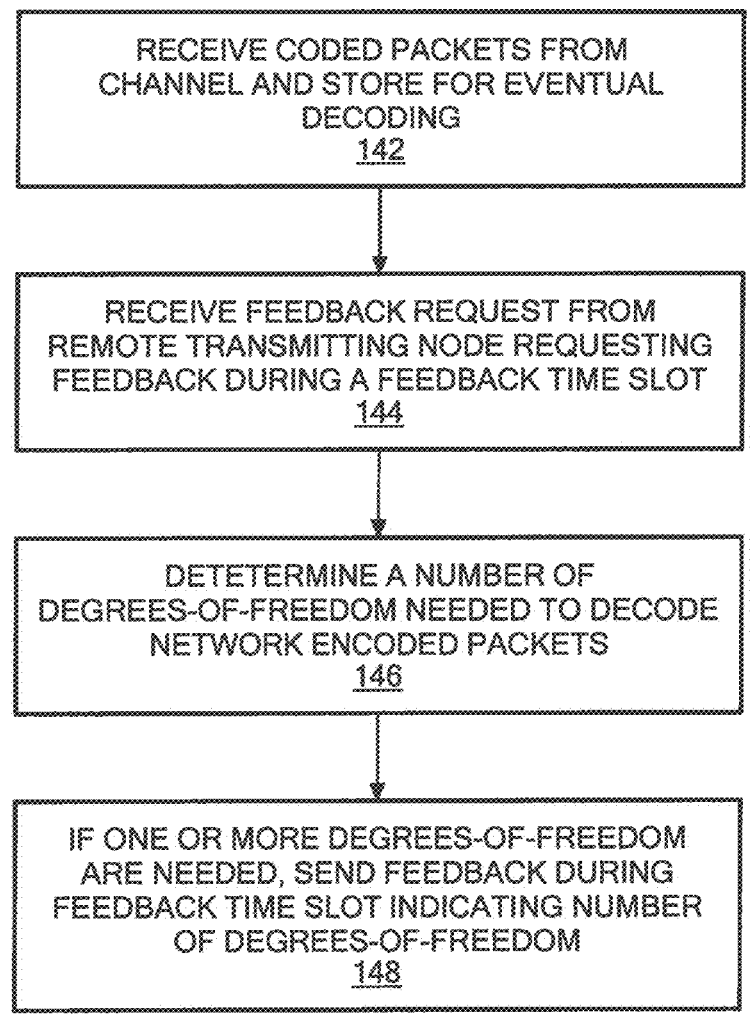
FIG. 8 is a flowchart illustrating another example method for managing feedback in a network that uses network coding in accordance with an implementation.

FIG. 8 is a flowchart illustrating a method 140 for managing feedback in a network that uses coding in accordance with an implementation. The coding may include, for example, random linear network coding, fountain coding, systematic coding, or some other type of structured coding. The method 140 may be implemented within, for example, a node acting as a destination node in a network (e.g., node 14 of wireless network arrangement 10 of FIG. 1, etc.). A number of coded packets may be received from a channel and stored in a local memory for eventual decoding (block 142). A feedback request may be received requesting feedback during a feedback time slot (block 144). A number of DOFs that are needed to decode received coded packets (e.g., network coded packets, packets encoded with a fountain code, etc.) may be determined (block 146), if one or more DOFs are needed, feedback may be transmitted during the feedback time slot that identifies the number of DOFs (block 148). The feedback may be transmitted using, for example, the jitter technique of FIG. 5, the DS-CDMA technique of FIG. 6, or some other techniques described above, in some implementations, a feedback request may identify multiple feedback time slots that may be used to return DOF information.

Simulations have shown that single feedback time slot implementations are relatively robust to channel estimation errors. Thus, in implementations where physical considerations do not allow for an accurate estimation of the channel, one technique that may be used is to underestimate $p_e$ so that the predictive model may schedule the initial feedback at an earlier time slot. Because the feedback penalty is only 1 time slot, this earlier feedback may avoid significant loss of throughput and the previous estimation of $p_e$ may be adjusted based on the feedback. Simulation results have shown that, for a network of n=1000 receivers and k=100 packets, if a channel with $P_e=0.2$ was estimated to have $p_e=0.1$, the total file download time may be increased from 151 time slots to 152 time slots.

The techniques described herein may also be robust against correlated losses among users. Correlation of erasures among users can be thought of as reducing n, the number of independent users, and thus may have a similar effect to decreasing n.

The techniques described herein may also be robust to feedback erasures. Unlike NACK suppression schemes of the past that allow only a few nodes to send feedback, the present techniques allow every eligible node to participate in the feedback and, if feedback from a particular destination node is erased, the source node will still be able to use the feedback from other nodes. In some implementations, as described above, an additional improvement in robustness may be achieved by allowing a source node to schedule one or more additional feedback time slots even if the source node does not receive any feedback during a previous feedback cycle. This additional feedback time slot or slots may be used to, for example, confirm that transmissions can end. This technique may increase robustness to feedback erasures with minimal cost to total download time.

Figure 10:
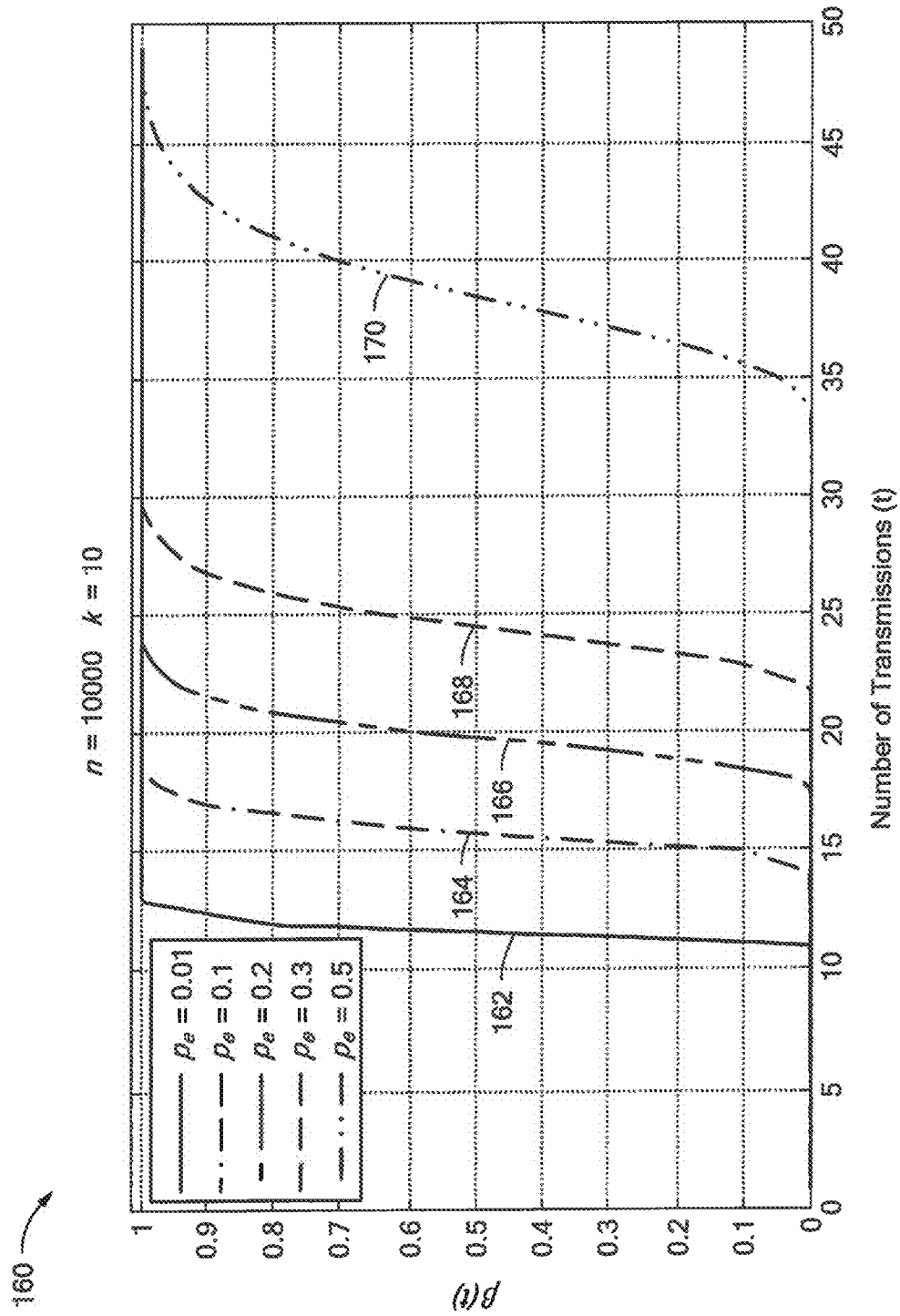
FIG. 10 is a plot illustrating how transmission completion probability β(t) may vary with packet erasure probability $p_e$ in accordance with an implementation.
Figure 11:
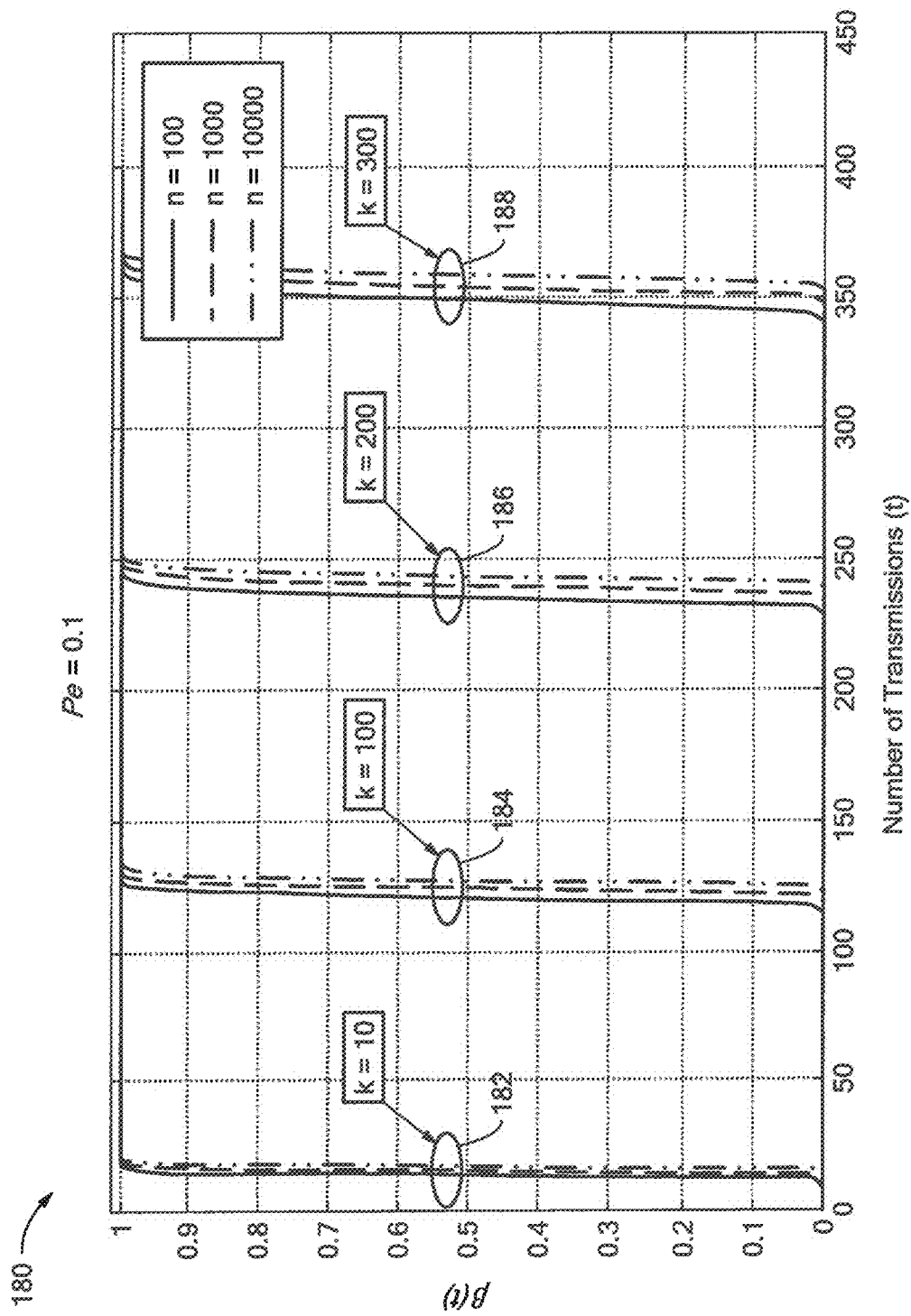
FIG. 11 is a plot illustrating how transmission completion probability β(t) may vary with the number of destination nodes in and the number of original packets k in accordance with an implementation.

FIGS. 10 and 11 are example plots illustrating how transmission completion probability $\beta(t)$ may vary for different parameter values in various implementations. FIG. 10 is a plot 160 that includes a number of curves 162, 164, 166, 168, 170 that show how $\beta(t)$ may vary with packet erasure probability $p_e$. FIG. 11 is a plot 180 that includes a number of curve groups 182, 184, 186, 188 that show how $\beta(t)$ may vary with the number of destination nodes n and the number of original packets k. As described previously, $\beta(t)$ is the probability that transmissions can cease after t time slots. Referring now to FIG. 10, it is shown that the time at which transmissions can cease may be very sensitive to packet erasure probability. As shown, for a network of n=1000 nodes and k=10 packets, the probability $\beta(t)=0.7$ is achieved after 21 time slots when $p_e=0.2$. This number increases to 40 time slots when $p_e=0.5$. It should also be noted from FIG. 10 that the probabilities rise more sharply for smaller erasure probabilities than for larger ones. It should be noted that, in FIG. 10, the curves 162, 164, 166, 168, 170 are much sharper when erasure probabilities are low; thus, a significant increase in reliability may be achieved by very few extra transmissions when $p_e$ is low.

Turning now to FIG. 11, it is seen that the number of transmissions may be strongly dependent on the file size k, but may not be particularly sensitive to the number of receivers n. As shown, doubling the number of packets in the file may roughly double the number of transmissions needed, for any given reliability. Ovals within the figure are used to show the proximity of the curves that correspond to an increase in n (from n=100 to n=10000) for a fixed k. As FIG. 11 illustrates, the number of coded packet transmissions required for a given reliability is not very sensitive to an increase in n, so large changes in n require only small changes to the number of packets transmitted. FIG. 11 also shows the robustness of the transmission scheme to uncertainty in n.

Figure 12:
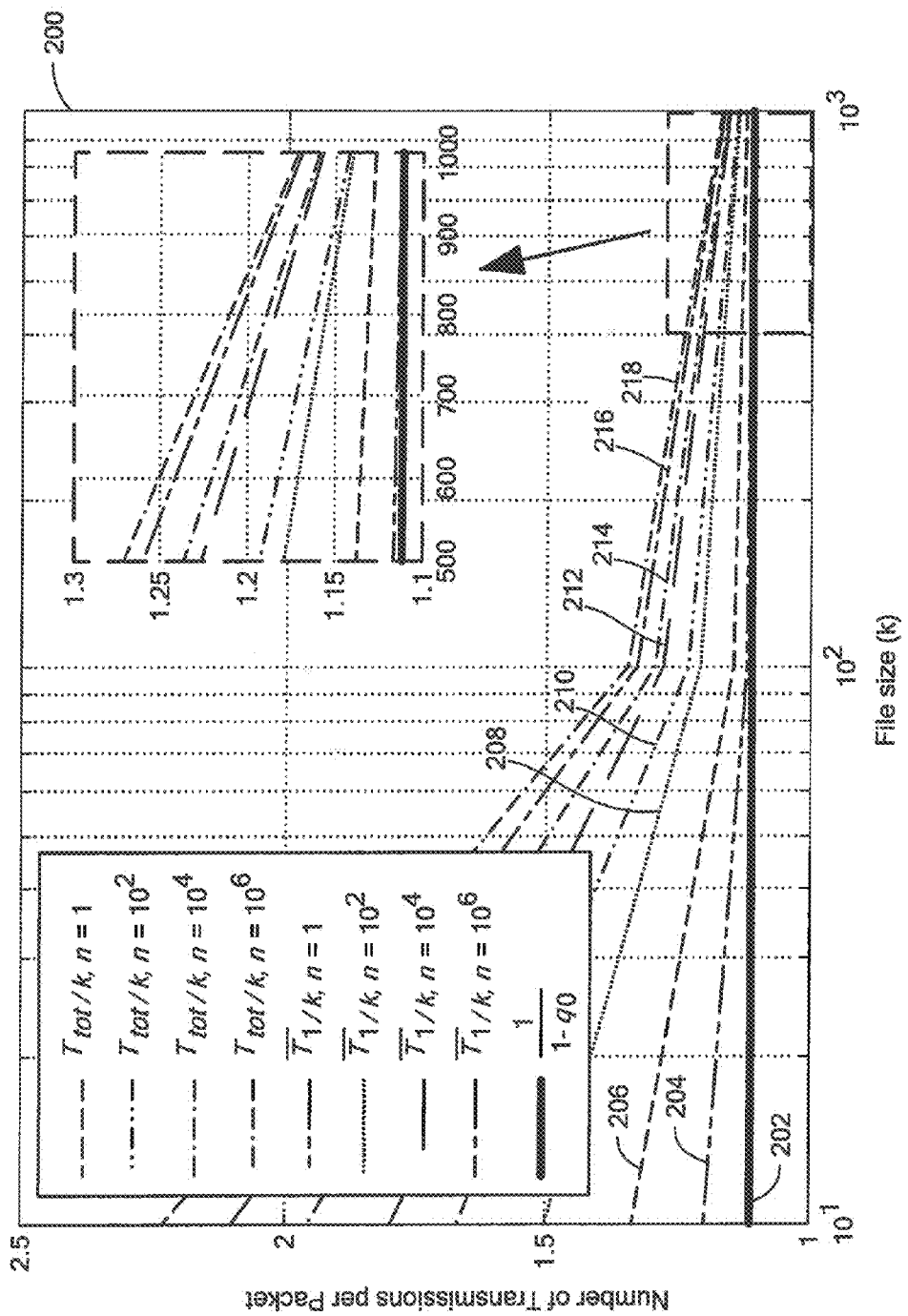
FIG. 12 is a plot illustrating computed values of $\overline{T_1}/k$ and simulated values of $T_{tot}/k$ for various combinations of number of packets and number of nodes in accordance with an implementation.

FIG. 12 is a plot 200 illustrating computed values of $\overline{T_1}/k$ and simulated values of $T_{tot}/k$ for $k\in[10, 10^3]$, $n\in[1, 10^6]$, and $q0=0.1$ in accordance with an implementation. As illustrated, the plot 200 includes a plurality of curves 202, 204, 206, 208, 210, 212, 214, 216, and 218, where curve 202, corresponds to a per packet transmission time of $1/(1-q0)$; curve 204 corresponds to $\overline{T_1}/k$, n=1; curve 206 corresponds to $T_{tot}/k$, n=1; curve 208 corresponds to $\overline{T_1}/k$, n=$10^2$; curve 210 corresponds to $T_{tot}/k$, n=$10^2$; curve 212 corresponds to $\overline{T_1}/k$, n=$10^4$; curve 214 corresponds to $T_{tot}/k$, n=$10^4$; curve 216 corresponds to $\overline{T_1}/k$, n=$10^6$; and curve 218 corresponds to $T_{tot}/k$, n=$10^6$. As shown in the figure, the close proximity of the total download time $T_{tot}$ to the time of the first feedback $\overline{T_1}$ verifies that very few, if any, retransmissions are required after the first feedback time slot. It should be noted that neither $T_{tot}$ nor $\overline{T_1}$ are sensitive to the number of users, n. For example, when transmitting a file of k=100 packets, $T_{tot}$ increases from 115 to 135 when the number of users increases from 1 to $10^6$. FIG. 12 illustrates this point by showing that the per packet download completion time for the worst case node increases from 1.15 to only 1.35, despite a large increase in n.

The techniques and structures described herein may be implemented in any of a variety of different forms. For example, features of the invention may be embodied within various forms of communication devices, both wired and wireless; television sets; set top boxes; smart phones; audio/video devices; laptop, palmtop, desktop, and tablet computers with or without wireless capability; sensors; personal digital assistants (PDAs); telephones; pagers; satellite communicators; cameras having communication capability; airborne transceivers residing on, for example, aircraft, helicopters, etc; maritime transceivers; network interface cards (NiCs) and other network interface structures; base stations; wireless access points; integrated circuits; as instructions and/or data structures stored on non-transitory computer readable media; and/or in other formats. Examples of different types of computer readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data.

Having described implementations which serve to illustrate various concepts, structures, and techniques which are the subject of this disclosure, it will now become apparent to those of ordinary skill in the art that other implementations incorporating these concepts, structures, and techniques may be used. Accordingly, it is submitted that that scope of the patent should not be limited to the described implementations but rather should be limited only by the spirit and scope of the following claims.

What is claimed is:

1. A machine implemented method for use in distributing information about a plurality of data packets from a source node to a plurality of destination nodes in a network using a code, the method comprising:
   transmitting coded packets by the source node during successive time slots, each coded packet having been generated using the plurality of data packets and a predetermined code; and
   selecting, by the source node, at least one future feedback time slot using a predictive model, wherein the at least one selected future feedback time slot includes one or more time slots during which one or more of the destination nodes are permitted to transmit feedback to the source node,
   wherein the predictive model selects the at least one future feedback time slot based, at least in part, on a probability that all of the destination nodes can successfully decode the plurality of data packets.

2. The method of claim 1, further comprising:
   after selecting the at least one future feedback time slot, transmitting a feedback request message requesting transmission of feedback by destination nodes during the at least one future feedback time slot.

3. The method of claim 2, wherein:
the feedback request message requests that destination nodes transmit feedback during the at least one future feedback time slot if they have not yet successfully received enough coded packets to be able to extract the plurality of data packets by the at least one future feedback time slot.

4. The method of claim 2, wherein:
the feedback request message requests that the destination nodes that are not yet able to extract the plurality of data packets from received coded packets transmit an indication of a number of degrees of freedom needed to be able to extract the plurality of data packets from received coded packets.

5. The method of claim 1, wherein:
each coded packet includes a linear combination of the plurality of data packets.

6. The method of claim 1, wherein:
the coded packets include packets that were generated using random linear network coding (RLNC) techniques.

7. The method of claim 1, wherein:
the coded packets include packets that were generated using a fountain code.

8. The method of claim 1, wherein:
the coded packets include packets that were generated using a systematic code.

9. The method of claim 1, wherein:
the coded packets include packets that were generated using a structured code.

10. The method of claim 1, wherein:
selecting at least one future feedback time slot includes selecting a time slot based, at least in part, on an expected total transmission time until each destination node in the plurality of destination nodes has successfully received enough coded packets to be able to extract the plurality of data packets from the successfully received coded packets.

11. The method of claim 10, wherein:
selecting at least one future feedback time slot includes calculating the expected total transmission time based, at least in part, on one or more estimated packet erasure probabilities.

12. The method of claim 1, wherein:
selecting at least one future feedback time slot includes selecting a feedback time slot based, at least in part, on a probability that k or more coded packets will have been successfully received by all destination nodes after t time slots, where k is the number of data packets in the plurality of data packets.

13. The method of claim 1, wherein:
selecting at least one future feedback time slot includes selecting a single future feedback time slot.

14. The method of claim 13, further comprising:
analyzing feedback received as a result of the single feedback time slot to determine a highest number of degrees of freedom needed by a destination node.

15. The method of claim 14, further comprising:
transmitting M additional coded packets in response to the feedback, where M is an integer selected based, at least in part, upon the highest number of degrees of freedom needed by a destination node.

16. The method of claim 14, further comprising:
terminating transmission of coded packets if the highest number of degrees of freedom needed by a destination node is zero.

17. The method of claim 14, farther comprising:
if the highest number of degrees of freedom needed by a destination node is zero, selecting at least one additional feedback time slot and transmitting a feedback request message requesting transmission of feedback by destination nodes during the at least one additional feedback time slot to confirm that the highest number of degrees of freedom needed by a destination node is zero.

18. The method of claim 14, wherein:
analyzing feedback includes checking one or more sub-slots within the single feedback time slot for a signal, wherein different sub-slots in the single feedback time slot correspond to different numbers or percents of degrees-of-freedom needed.

19. The method of claim 18, wherein checking one or more sub-slots within the single feedback time slot includes:
checking the one or more sub-slots for a signal in an order based upon degrees-of-freedom needed; and
terminating checking the one or more sub-slots after a first signal is detected.

20. The method of claim 14, wherein:
feedback within the single feedback time slot is transmitted by destination nodes using direct sequence code division multiple access (DS-CDMA), wherein different DS-CDMA codes correspond to different numbers or percents of degrees-of-freedom needed.

21. The method of claim 20, wherein analyzing feedback includes:
applying a series of matched filters in an order that is based on the number or percents of degrees-of-freedom needed; and
terminating applying the series of matched filters after a first correlation is detected.

22. A machine implemented method for use in a network, comprising:
receiving, by a destination node of the network, coded packets from a channel during channel time slots and storing the coded packets in a memory for eventual decoding, each coded packet including a plurality of data packets encoded with a code;
receiving, by the destination node, a feedback request message from a remote source node requesting feedback during a future feedback time slot, the future feedback time slot selected based on a predictive model, wherein the predictive model selects the future feedback time slot based, at least in part, on a probability that the destination node can successfully decode the plurality of data packets;
determining, by the destination node, whether enough coded packets have been successfully received to extract the plurality of data packets from the received coded packets; and
transmitting, by the destination node, feedback during the selected future feedback time slot if enough coded packets have not been successfully received.

23. The method of claim 22, wherein:
the coded packets include packets that are linear combinations of the plurality of data packets.

24. The method of claim 22, wherein:
receiving coded packets includes receiving packets that were generated using random linear network coding (RLNC) techniques.

25. The method of claim 22, wherein:
receiving coded packets includes receiving packets that were generated using a fountain code.

26. The method of claim 22, wherein:
receiving coded packets includes receiving packets that were generated using a systematic code.

27. The method of claim 22, wherein:
receiving coded packets includes receiving packets that were generated using a structured code.

28. The method of claim 22, wherein:
determining whether enough coded packets have been successfully received to extract the plurality of data packets includes determining a number of degrees of freedom needed to extract the plurality of data packets.

29. The method of claim 22, wherein:
transmitting feedback during the feedback time slot includes transmitting an indication of the number of degrees of freedom needed during the feedback time slot.

30. The method of claim 29, wherein:
transmitting an indication of the number of degrees of freedom needed during the feedback time slot includes transmitting a pulse within a sub-slot of the feedback time slot that corresponds to the number of degrees of freedom needed.

31. The method of claim 29, wherein:
transmitting an indication of the number of degrees of freedom needed during the feedback time slot includes transmitting a direct sequence code division multiple access (DS-CDMA) signal during the feedback time slot that uses a code corresponding to the number of degrees of freedom needed.

32. A node device for use in distributing information about a plurality of data packets to a plurality of destination nodes in a network using a code, the node device comprising:
one or more processors;
a memory coupled to the one or more processors and configured to store at least one of the plurality of data packets;
a coding manager configured to execute on at least one of the one or more processors to generate coded packets using the plurality of data packets and to cause the coded packets to be transmitted in the network; and
a feedback time slot selector configured to execute on at least one of the one or more processors to select at least one future feedback time slot for use by destination nodes to transmit feedback to the node device, the feedback time slot selector to select at least one future feedback time slot based, at least in part, on a predictive model,
wherein the predictive model selects the at least one future feedback time slot based, at least in part, on a probability that all of the destination nodes can successfully decode the plurality of data packets.

33. The node device of claim 32, wherein:
the feedback time slot selector is to select the at least one future feedback time slot based, at least in part, on an expected total transmission time until each destination node in the plurality of destination nodes has successfully received enough coded packets to extract the plurality of data packets.

34. The node device of claim 32, wherein:
the feedback time slot selector is to transmit a feedback request message to destination nodes of the network requesting feedback during the at least one future feedback time slot.

35. The node device of claim 34, wherein:
the feedback request message requests feedback about a number of degrees-of-freedom needed by destination nodes to extract the plurality of data packets from received coded packets.

36. The node device of claim 34, wherein:
the feedback request message requests that destination nodes transmit feedback during the at least one future feedback time slot if they are not yet able to extract the plurality of data packets from received coded packets.

37. The node device of claim 32, wherein:
the feedback time slot selector initially selects a single feedback time slot for use by destination nodes to transmit feedback to the node device.

38. The node device of claim 37, wherein:
the feedback that is transmitted by a destination node during the single feedback time slot includes information identifying a number of degrees of freedom needed by the destination node to extract the plurality of data packets from received coded packets; and
the node device further comprises a feedback analyzer to analyze feedback received during the single feedback time slot to determine a highest number of degrees of freedom needed by a destination node.

39. The node device of claim 38, wherein:
the coding manager is to transmit M additional coded packets in response to the feedback, where M is a positive integer selected based, at least in part, upon the highest number of degrees of freedom needed by a destination node.

40. The node device of claim 38, wherein:
the single feedback time slot includes a series of sub-slots, each sub-slot corresponding to a different number or percent of degrees of freedom needed, wherein a destination node that needs one or more degrees of freedom is to transmit a pulse within an appropriate sub-slot of the single feedback time slot; and
the feedback analyzer is to check one or more sub-slots within the single feedback time slot for a pulse.

41. The node device of claim 40, wherein:
the feedback analyzer is to check one or more sub-slots within the single feedback time slot in an order based upon number of degrees-of-freedom needed and stop checking sub-slots after a first pulse is detected.

42. The node device of claim 40, wherein:
the sub-slots in the series of sub-slots are ordered so that neighboring sub-slots correspond to a similar number of degrees-of-freedom needed.

43. The node device of claim 32, wherein:
the feedback that is transmitted by destination nodes during the single feedback time slot, if any, is transmitted using direct sequence code division multiple access (DS-CDMA), wherein a number of CDMA codes are defined that each correspond to a different number or percent of degrees of freedom needed; and
the feedback analyzer is to apply a series of matched filters to feedback received during the single feedback time slot, the matched filters each being associated with a particular code of the CDMA codes, wherein the feedback analyzer is to apply the series of matched filters in an order that is based on degrees-of-freedom needed.

44. The node device of claim 43, wherein:
the CDMA codes are ordered so that pairs of codes that represent similar numbers or percents of degrees-of-freedom needed have higher correlations than pairs of codes that represent very different numbers or percents of missing degrees-of-freedom.

45. The node device of claim 44, wherein:
the feedback analyzer is to stop application of the series of matched filters after a first correlation is detected.

46. The node device of claim 32, wherein:
the feedback time slot selector is to select the at least one future feedback time slot based, at least in part, on a probability that each destination node in the plurality of destination nodes will have successfully received enough coded packets to extract the plurality of data packets by time t, wherein the probability that each destination node in the plurality of destination nodes has successfully received enough coded packets to extract the plurality of data packets by time t is determined based, at least in part, on estimated packet erasure probabilities in the network.

47. The node device of claim 32, wherein:
the coding manager is configured to implement at least one of a random linear network code, a fountain code, a systematic code, and a structured code.

48. A node device for use in a network, the node device comprising:
a receiver to receive coded packets from a channel;
one or more processors;
a memory coupled to the one or more processors and configured to store the coded packets received from the channel;
a decoder configured to execute on at least one of the one or more processors to decode the coded packets stored in the memory to extract a plurality of data packets when a sufficient number of coded packets are available in the memory;
a degrees-of-freedom (DOFs) calculator configured to execute on at least one of the one or more processors to calculate a number of DOFs that are needed to decode the coded packets; and
a feedback generator configured to execute on at least one of the one or more processors to transmit feedback to a remote source node during a feedback time slot, in response to a feedback request, if the number of DOFs needed is one or more, wherein the feedback request includes an indication of the feedback time slot.

49. The node device of claim 48, wherein:
the feedback transmitted by the feedback generator during the feedback time slot includes an indication of the number of DOFs needed to decode the coded packets.

50. The node device of claim 48, wherein:
the feedback transmitted by the feedback generator during the feedback time slot includes a pulse within a sub-slot of the feedback time slot that corresponds to the number of DOFs.

51. The node device of claim 48, wherein:
the feedback transmitted by the feedback generator during the feedback time slot includes a direct sequence code division multiple access (DS-CDMA) signal that uses a code that corresponds to the number of degrees of freedom.

52. The node device of claim 48, wherein:
the feedback time slot is selected by the remote source node based, at least in part, on a probability that each destination node in the plurality of destination nodes will have successfully received enough coded packets to extract the plurality of data packets by time t.

53. The node device of claim 48, wherein:
the feedback time slot is selected by the remote source node based, at least in part, on an expected total transmission time until each destination node in the plurality of destination nodes has successfully received enough coded packets to extract the plurality of data packets.

54. The node device of claim 48, wherein:
the coded packets received by the receiver are coded with at least one of: a random linear network code, a fountain code, a systematic code, and a structured code.

55. An apparatus comprising a non-transitory computer readable medium having instructions stored thereon that, when executed by a computing system, carry out a method for use in distributing information about a plurality of data packets from a source node to a plurality of destination nodes in a network using a code, the method comprising:
transmitting coded packets by the source node during successive time slots, wherein each coded packet is generated using the plurality of data packets; and
selecting, at least one future feedback time slot using a predictive model, wherein the at least one selected future feedback time slot includes one or more time slots during which one or more of the destination nodes are permitted to transmit feedback to the source node, wherein the predictive model selects the at least one future feedback time slot based, at least in part, on a probability that all of the destination nodes can successfully decode the plurality of data packets.

56. An apparatus comprising a non-transitory computer readable medium having instructions stored thereon that, when executed by a computing system, carry out a method for use in a network, the method comprising:
receiving, by a destination node of the network, coded packets from a channel during channel time slots and storing the coded packets in a memory for eventual decoding, each coded packet including a plurality of data packets encoded with a code;
receiving, by the destination node, a feedback request message from a remote source node requesting feedback during a future feedback time slot, the future feedback time slot selected based on a predictive model, wherein the predictive model selects the at least one future feedback time slot based, at least in part, on a probability that all of the destination nodes can successfully decode the plurality of data packets;
determining, by the destination node, whether enough coded packets have been successfully received to extract the plurality of data packets from the received coded packets; and
transmitting, by the destination node, feedback during the selected future feedback time slot if enough coded packets have not been successfully received.

* * * * *